US009617076B2

(12) United States Patent
McFaull

(10) Patent No.: US 9,617,076 B2
(45) Date of Patent: Apr. 11, 2017

(54) CONVEYOR SYSTEM AND METHOD FOR TRANSPORTING MATERIAL

(71) Applicant: Newmont USA Limited, Greenwood Village, CO (US)

(72) Inventor: Colin Wayne McFaull, Winthrop (AU)

(73) Assignee: NEWMONT USA LIMITED, Greenwood Village, CO (US)

( * ) Notice: Subject to any disclaimer, the term of this patent is extended or adjusted under 35 U.S.C. 154(b) by 0 days.

(21) Appl. No.: 15/039,574

(22) PCT Filed: Dec. 11, 2014

(86) PCT No.: PCT/US2014/069755
§ 371 (c)(1),
(2) Date: May 26, 2016

(87) PCT Pub. No.: WO2015/089286
PCT Pub. Date: Jun. 18, 2015

(65) Prior Publication Data
US 2017/0036860 A1    Feb. 9, 2017

Related U.S. Application Data

(60) Provisional application No. 61/915,290, filed on Dec. 12, 2013.

(51) Int. Cl.
*B65G 15/40* (2006.01)
*B65G 15/08* (2006.01)

(52) U.S. Cl.
CPC ............. *B65G 15/40* (2013.01); *B65G 15/08* (2013.01)

(58) Field of Classification Search
CPC ......... B65G 15/40; B65G 15/08; B65G 17/04
See application file for complete search history.

(56) References Cited

U.S. PATENT DOCUMENTS

| 2,845,166 A | 7/1958 | Schaeffer |
| 2,928,525 A * | 3/1960 | Schaeffer ............... B65G 15/08 138/128 |
| 3,164,238 A | 1/1965 | McCullah |
| 3,586,156 A | 6/1971 | Easley, Jr. |

(Continued)

*Primary Examiner* — Mark A Deuble
(74) *Attorney, Agent, or Firm* — Marsh Fischmann & Breyfogle LLP; Ross E. Breyfogle

(57) ABSTRACT

Load carrying belts, a conveyor system incorporating such belts and a method for transporting material from a loading zone to an unloading zone are provided. In one embodiment of a conveyor system, a specially configured belt is hung from a haul rope that loops around a pair of rotatable end sheaves. If necessary, there may be one or more intermediary support towers in spaced apart locations between the end sheaves having one or more support rollers over which the haul rope rides. The belt is specifically configured for hanging from the haul rope and providing one or more compartments within which the material being transported is enclosed. The compartment(s) may be opened in the loading zone to permit introduction of material to be transported into the compartment(s), closed between the loading zone and the unloading zone, and reopened in the unloading zone to permit discharge of the material. In some embodiments, the belt may include a plurality of corrugations in order to enhance flexibility of the belt.

9 Claims, 19 Drawing Sheets

(56) References Cited

U.S. PATENT DOCUMENTS

| | | | | |
|---|---|---|---|---|
| 3,999,646 | A | * | 12/1976 | Yoshida ................. B65G 15/40 198/680 |
| 4,280,620 | A | | 7/1981 | Baker, Jr. |
| 4,809,844 | A | * | 3/1989 | Hashimoto ............ B65G 15/08 198/819 |
| 4,850,476 | A | | 7/1989 | Yoshida |
| 7,032,744 | B1 | | 4/2006 | Pietsch |
| 7,866,463 | B2 | * | 1/2011 | Brunone ................ B65G 15/08 198/819 |
| 2009/0078542 | A1 | * | 3/2009 | Fuchs .................... E21F 13/02 198/810.04 |
| 2015/0075949 | A1 | * | 3/2015 | Whelan ................. B65G 15/60 198/813 |

* cited by examiner

OPEN BY LIFTING

OPEN OTHER SIDE

LAY FLAT FOR DISCHARGE

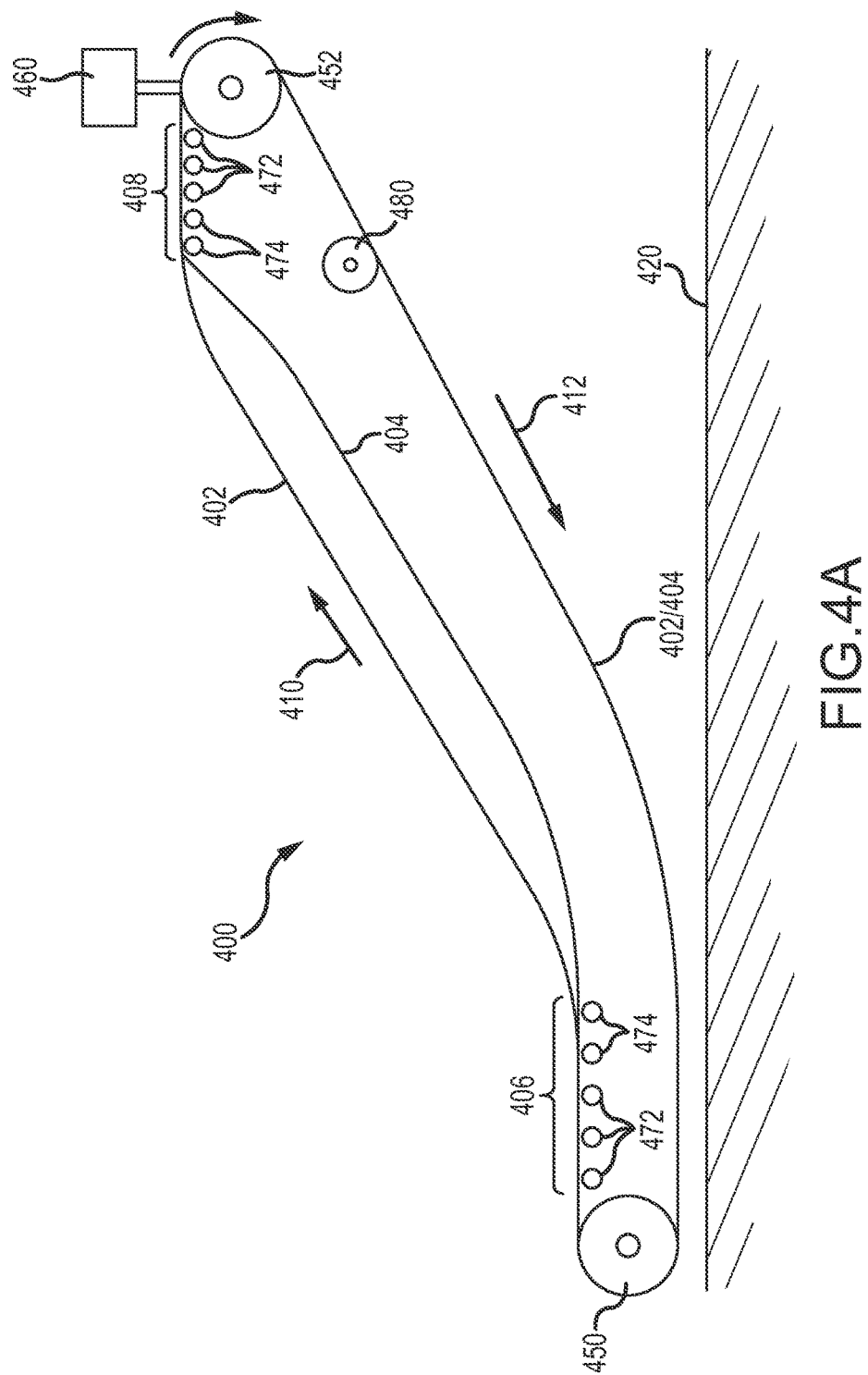

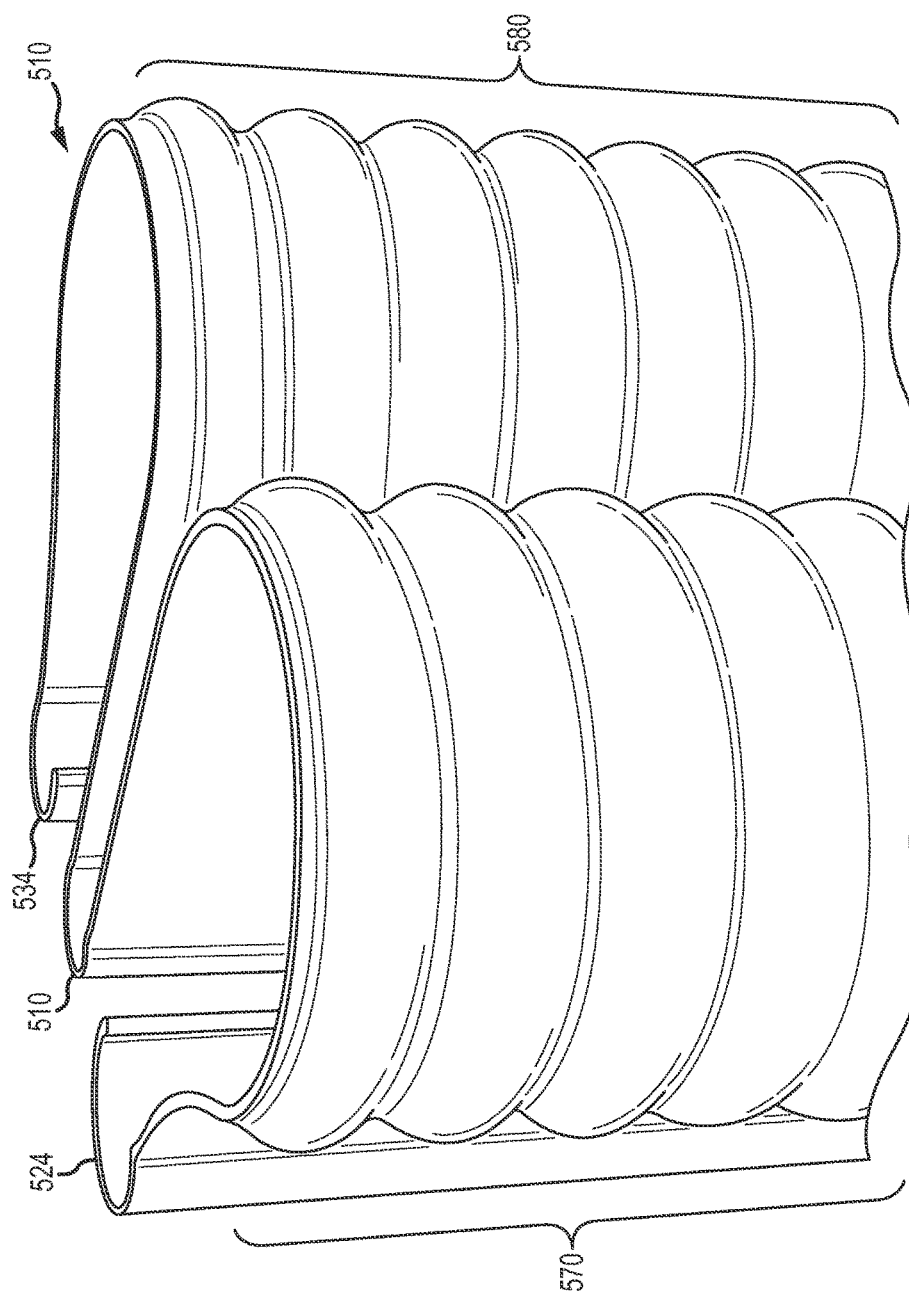

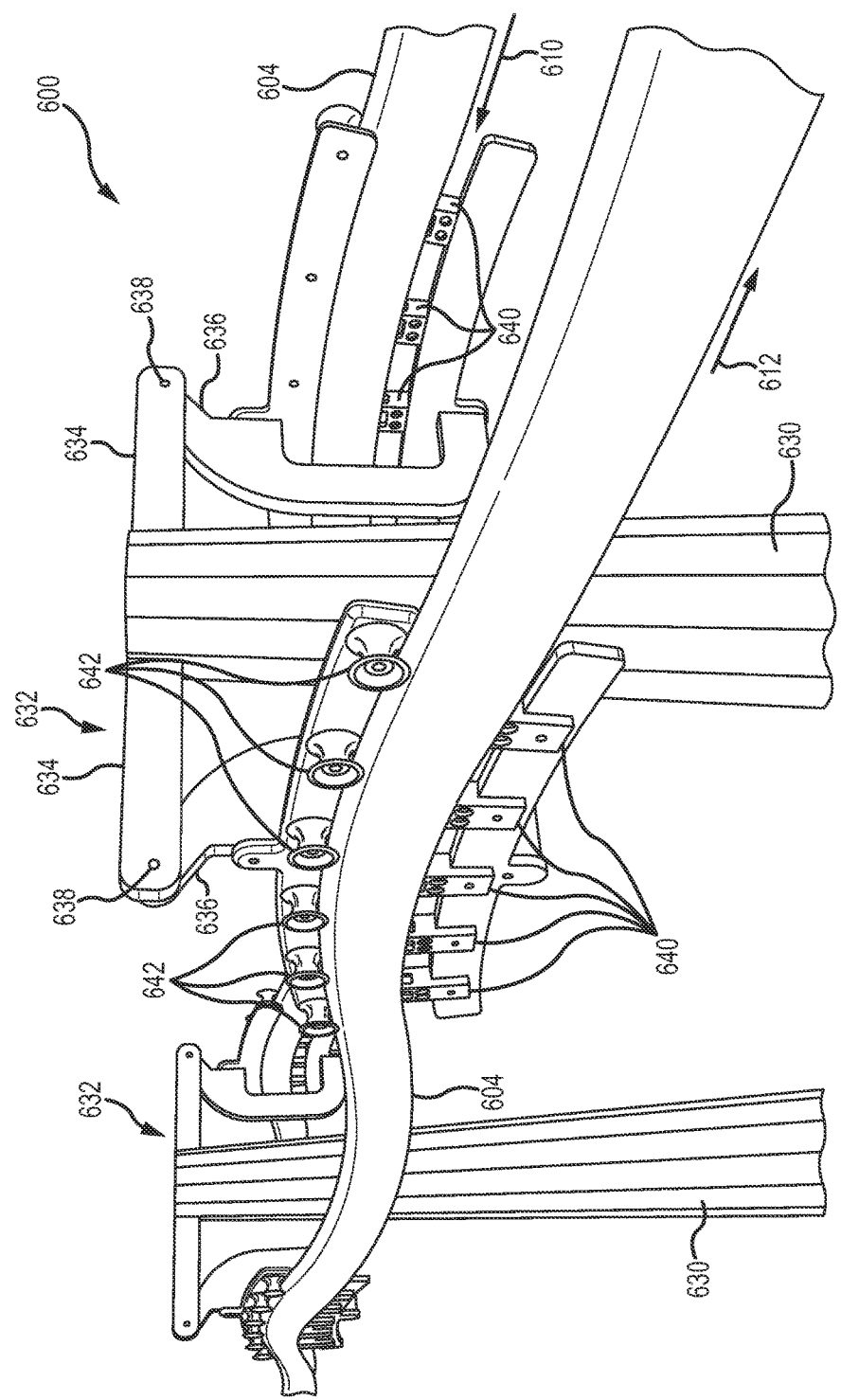

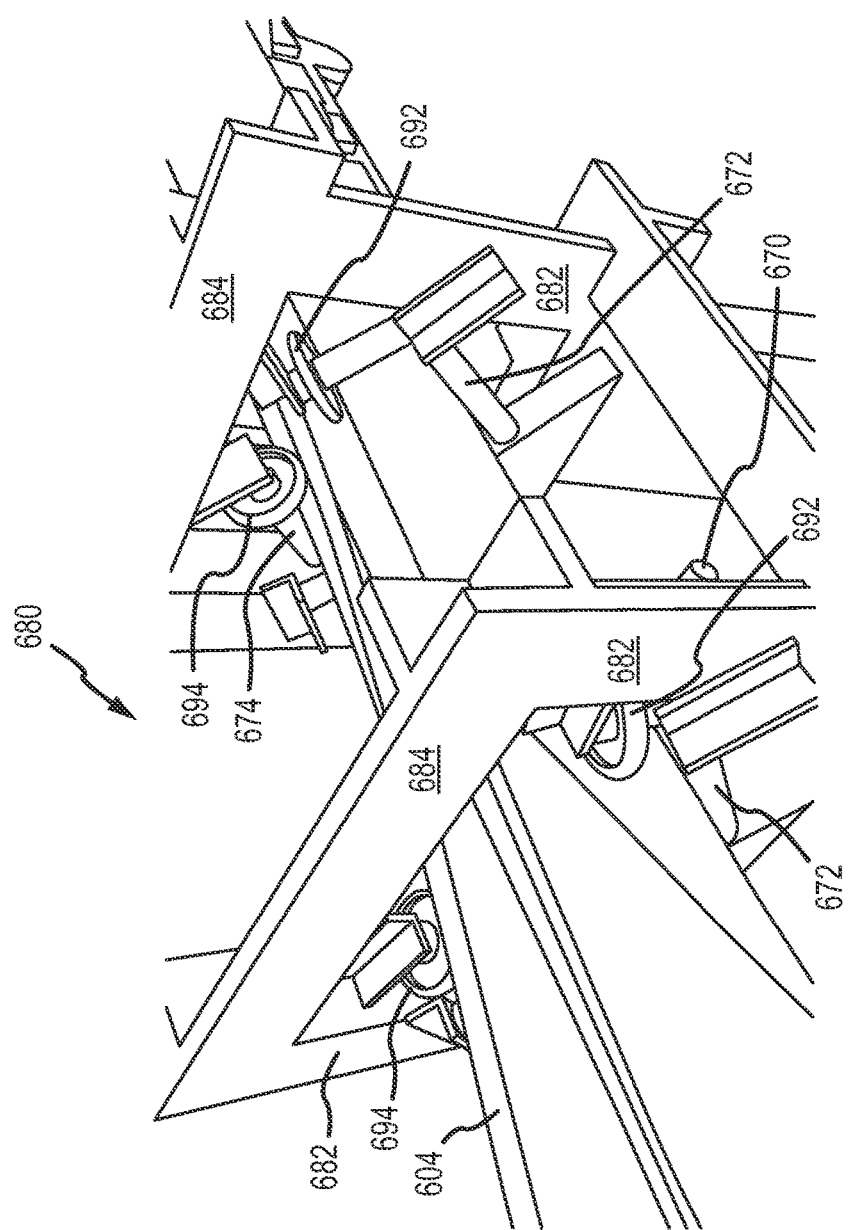

US 9,617,076 B2

CONVEYOR SYSTEM AND METHOD FOR TRANSPORTING MATERIAL

RELATED APPLICATION INFORMATION

This application claims priority from U.S. Provisional Application Ser. No. 61/915,290 filed on Dec. 12, 2013, and entitled "CONVEYOR SYSTEM AND METHOD FOR TRANSPORTING MATERIAL", the entire contents of which are incorporated by reference herein.

BACKGROUND OF THE INVENTION

In many industries it may often be desirable to transport material from one location to another location. For example, in the mine industry there is often a need to transport ore bearing rock from a mine site to a processing facility and also to transport waste rock after processing of ore bearing rock from the processing facility to a disposal area. Using vehicles such as large diesel powered dump trucks to transport such material can prove costly, particularly if a suitable road is long or difficult to construct and maintain due to terrain or other conditions.

One alternative to vehicle transport of material is to employ a conveyor system. However, many traditional conveyor systems employ a continuous series of closely spaced rollers supporting a flat belt that moves in a continuous loop from one end where material to be transported is piled on top of the flat belt to another end where the material in dumped from the belt which then loops back underneath to rollers to the first end. Such conveyor systems can prove costly to construct, particularly over long transport distances or difficult terrain conditions due to the need to provide structure supporting the series of closely spaced support rollers along the entire length of the belt. Also, if there is a need to cover the material during transport to reduce dust or limit the introduction of water into the transported material from rain or the snow, adding a cover structure over the flat belt conveyor further complicates construction and increases cost.

SUMMARY OF THE INVENTION

Accordingly, load carrying belts, a conveyor system and method for transporting material from a loading zone to an unloading zone are provided. The load carrying belts, conveyor system and method eliminate the need for a continuous structure of support rollers. Instead, a specially configured belt used to transport material is hung from a haul rope (e.g., a braided steel cable) that loops around a pair of rotatable end sheaves. Also, if needed, there may be one or more intermediary support towers in spaced apart locations between the end sheaves having one or more support rollers over which the haul rope rides.

The belt itself may be specifically configured for hanging from the haul rope and providing one or more compartments within which the material being transported is enclosed. Further, the belt may be specifically configured such that the compartment(s) may be opened in the loading zone to permit introduction of material to be transported into the compartment(s), closed between the loading zone and the unloading zone, and reopened in the unloading zone to permit discharge of the material. In this regard, in the loading and unloading zones, the belt may be generally flat, and between the loading and unloading zones one or more side portion(s) of the belt may be folded over onto a central portion of the belt that contacts the haul rope to define the closed compartment(s). Utilizing the belt itself to define the closed compartment(s) eliminates the need for a costly cover structure between the loading and unloading zones.

In one aspect, a load carrying belt hangable on a haul rope to transport material may comprise a central portion, a first side portion and a second side portion. The central portion may have a profile (e.g. semicircular) configured to substantially envelope at least a portion of the haul rope. The first side portion may extend laterally from the central portion and may be foldable toward the central portion to form a first compartment in which a first quantity of the material is receivable. The second side portion may extend laterally from the central portion in a direction opposite the first side portion and may be foldable toward the central portion to form a second compartment in which a second quantity of the material is receivable. Such a load carrying belt may be referred to herein as a dual compartment belt and may be usable in a conveyor system.

In another aspect, a load carrying belt hangable on a haul rope to transport material may comprise a central portion and a side portion. The central portion may have a profile (e.g. semicircular) configured to substantially envelope at least a portion of the haul rope. The side portion may extend laterally from the central portion and may be foldable toward the central portion to form a compartment in which a quantity of the material is receivable. Such a load carrying belt may be referred to herein as a single compartment belt and may be usable in a conveyor system.

In a further aspect, a conveyor system for moving material from a loading zone to an unloading zone may comprise a first end sheave, a second end sheave, a haul rope, a drive motor and a load carrying belt. The first and second end sheaves may be rotatable around respective axes thereof. The haul rope may form a continuous loop extending around a rim of the first end sheave and a rim of the second end sheave with the haul rope passing through the loading and unloading zones. The drive motor may be coupled to at least one of the first and second end sheaves with the drive motor being operable to turn at least one of the first and second end sheaves around its respective axis to pull the haul rope such that at least a portion of the haul rope is moved from the loading zone to the unloading zone. The load carrying belt may hang from the haul rope and may be configured to provide at least one compartment repeatedly openable and closeable along at least a portion of the belt to permit the compartment to be open within the loading zone allowing for introduction of a quantity of the material, closed between the loading and unloading zones, and open in the unloading zone allowing for discharge of the quantity of material. In this regard, the load carrying belt may, for example, comprise a dual compartment belt or it may comprise a single compartment belt.

In one more aspect, a method for conveying material from a loading zone to an unloading zone may include the step of pulling a haul rope forming a continuous loop extending around a rim of a first end sheave and a rim of a second end sheave such that at least a portion of the haul rope and a load carrying belt hanging from the haul rope are moved from the loading zone to the unloading zone. In this regard, the load carrying belt may be configured to provide at least one compartment for carrying the quantity of material. The method may also include opening the at least one compartment of the load carrying belt within the loading zone to permit introduction of the quantity of the material into the at least one compartment. The method may also include closing the at least one compartment of the load carrying belt to maintain the quantity of material within a closed compartment between the loading and unloading zones. The method may also include opening the at least one compartment of the load carrying belt within the unloading zone to permit discharge of the quantity of the material from the at least one compartment.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIG. 4A shows one embodiment of a conveyor system that may employ a haul rope and a single or dual compartment belt such as shown in FIG. 2 and FIGS. 1A-1E;

FIG. 5B is a side perspective view of the corrugated dual compartment load carrying belt of FIG. 5A;

FIGS. 6A-6F show portions of another embodiment of a conveyor system employing a haul rope and a non-corrugated belt such as shown in FIGS. 1A-1E.

DETAILED DESCRIPTION

Figure 1A:
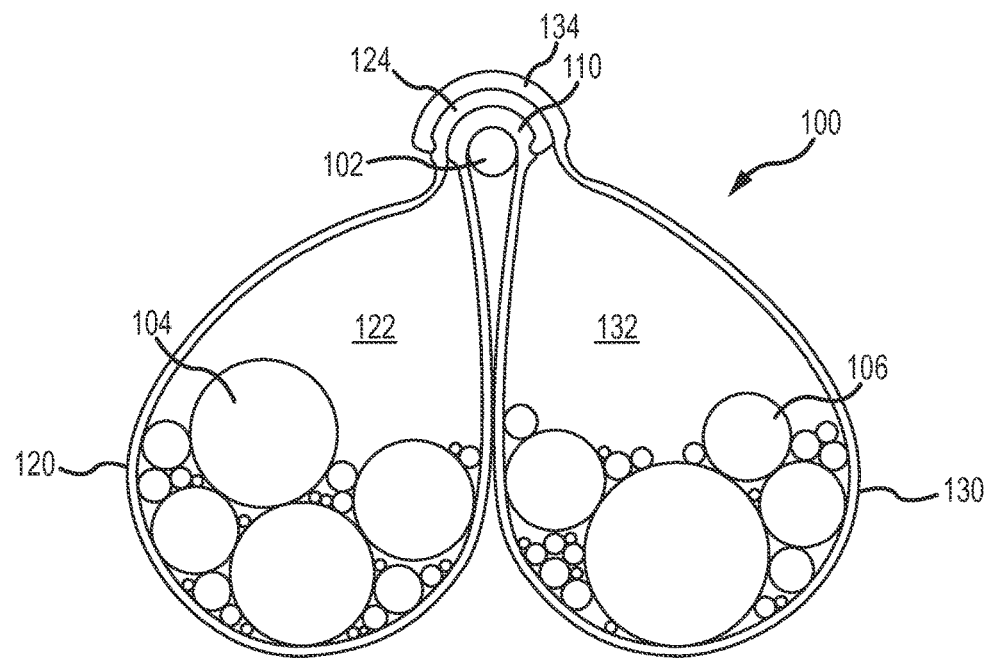
FIG. 1A is a cross-sectional view of one embodiment of a dual compartment load carrying belt illustrated in a folded and loaded condition while hanging from a haul rope.
Figure 1B:
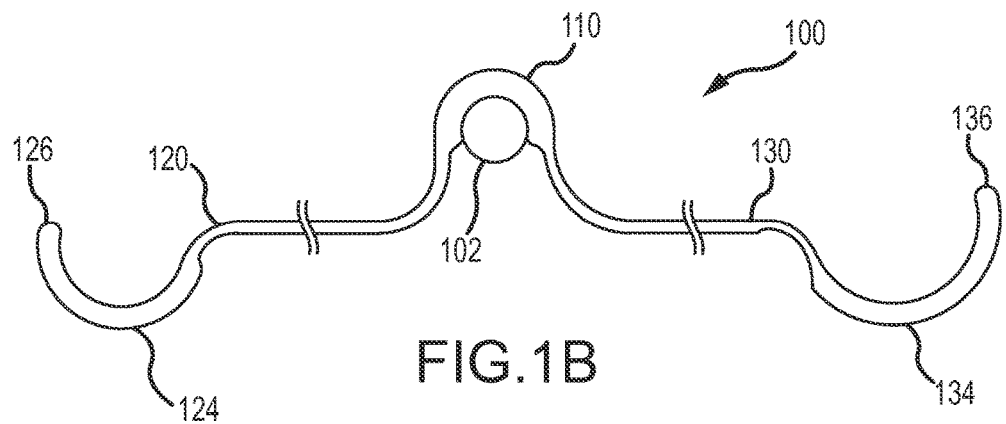
FIG. 1B is a cross-sectional view of the dual compartment load carrying belt of FIG. 1A illustrated in an unfolded and unloaded condition.
Figure 1C:
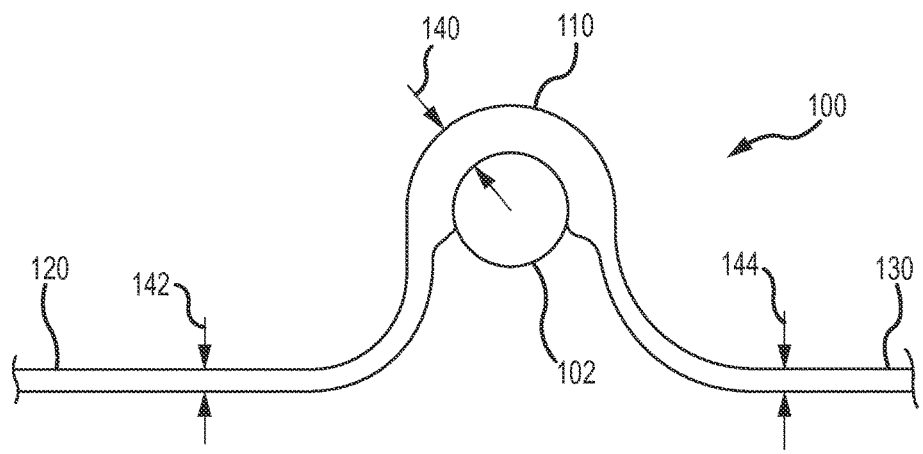
FIG. 1C is a cross-sectional view showing an enlarged view of a portion of the unfolded and unloaded dual compartment load carrying belt of FIG. 1B.

Referring the FIGS. 1A-1E, one embodiment of a dual compartment load carrying belt 100 that is fixable on a haul rope 102 includes a central portion 110, a first side portion 120 and a second side portion 130. The central portion 110 is configured to substantially envelope at least a portion of the haul rope 102. In this regard, the central portion 110 may have a semicircular cross-sectional profile such that an upper portion of the haul rope 102 is receivable in a semi-circular opening defined by the semi-circular profile of the central portion 110.

The first and second side portions 120, 130 extend laterally away from respective opposing edges of the central portion 110 of the load carrying belt 100. As illustrated in FIG. 1A, the first side portion 120 is foldable toward the central portion 110 to form a first side load carrying compartment 122 (also referred to herein as the first compartment 122) in which a first quantity of material 104 is receivable, and the second side portion 130 is foldable toward the central portion 110 to form a second side load carrying compartment 132 (also referred to herein as the second compartment 132) in which a second quantity of material 106 is receivable. In this regard, a strip 124 of the first side portion 120 proximal to an outside edge 126 of the first side portion 120 may overlap at least a portion of the central portion 110, and a strip 134 of the second side portion 130 proximal to an outside edge 136 of the second side portion 130 may overlap at least a portion of the strip 124 of the first side portion 120 overlapping at least a portion of the central portion 110 in order to provide the first and second compartments 122, 132 with a closed configuration. Providing closed first and second compartments 122, 132 is advantageous for a variety of reasons, including, for example, the load carrying belt 100 itself reduces the likelihood of material being lost from the belt 100 during transport, reduces contamination of the surrounding air due to dust escaping from the material being transported, and reduces the introduction of undesired substances (e.g. water from rain or snow) into the transported material, all without the need to construct a cover structure over the load carrying belt 100.

The central portion 110 of the load carrying belt 100 may have a median thickness 140 that is greater than a median thickness 142 of the first side portion 120 between the central portion 110 and the strip 124 proximal to outside edge 126 of the first side portion 120 and also greater than a median thickness 144 of the second side portion 130 between the central portion 110 and the strip 134 proximal to outside edge 136 of the second side portion 130. The greater thickness 140 of the central portion 110 relative to the thicknesses 142, 144 of the first and second side portions 120, 130 may enhance the strength of the central portion 110 as compared to the first and second side portions 120, 130. Enhancing the strength of the central portion 110 may be desirable because the load of the first and second quantities of material 104, 106 within the first and second compartments 122, 132 is concentrated where the central portion 110 contacts the haul rope 102. The reduced thicknesses 142, 144 of the first and second side portions 120, 130 between the respective strips 124, 126 relative to the central portion 110 may enhance the flexibility of the first and second side portions 120, 130 relative to the central portion 110. Enhancing the flexibility of the first and second side portions 120, 130 may facilitate folding of the first and second side portions 120, 130 to form the first and second compartments 122, 132.

Figure 1D:
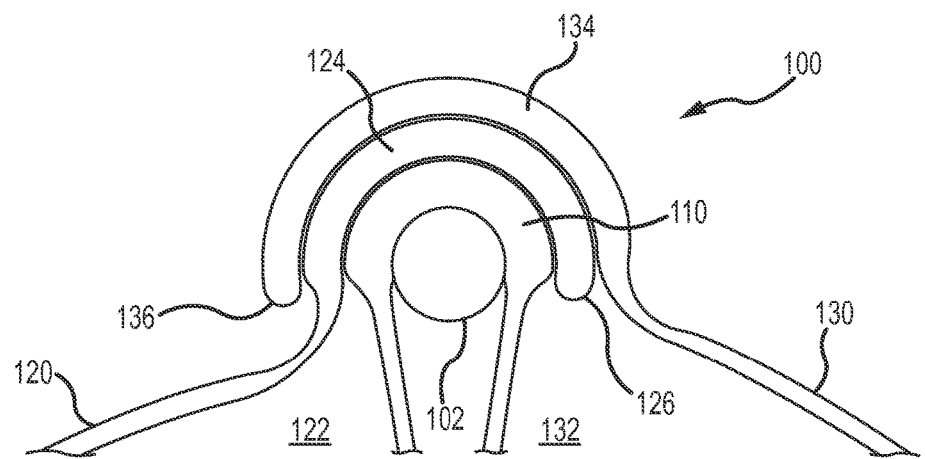
FIG. 1D is a cross-sectional view showing an enlarged view of a portion of the folded and loaded dual compartment load carrying belt of FIG. 1A.

FIG. 1D illustrates one example of overlapping of the central portion 110 by the first side strip 124 when the first side portion 120 is folded to form the first compartment 122 and overlapping of the first side strip 124 by the second side strip 134 when the second side portion 130 is folded to form the second compartment 132. In this regard, the first side portion 120 may be folded such that the first side strip 124 completely or nearly completely covers the central portion 110. Similarly, the second side portion 130 may be folded such that the second side strip 124 completely or nearly completely covers the bottom surface of the first side strip 124. Completely or nearly completely overlapping the central portion 110 with the first side strip 124 and the first side strip 124 with the second side strip 134 facilitates maintaining the first and second compartments 122, 132 in a closed configuration when loaded with the respective first and second quantities of material 104, 106 by providing the largest possible contact areas between the central portion 110 and the first side strip 124 and between the first side strip 124 and the second side strip 134. In other embodiments, such complete overlapping may not be necessary in order to maintain the first and second side compartments 122, 132 in a closed configuration when loaded.

Figure 1E:
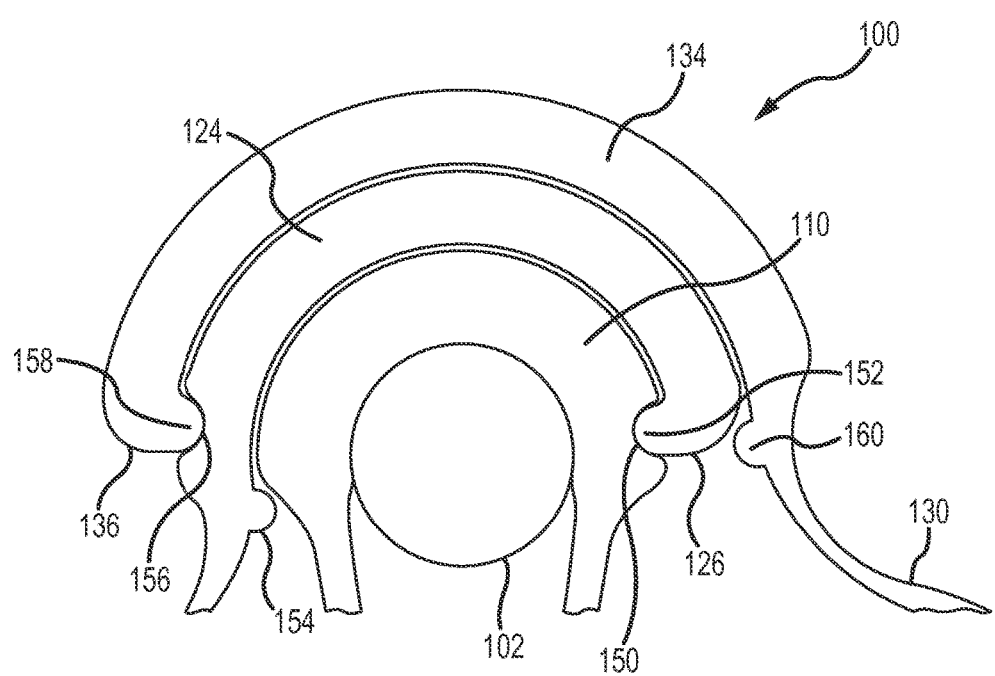
FIG. 1E is a cross-sectional view showing an enlarged view of a portion of one embodiment a load carrying belt with additional features to facilitate maintaining the belt in a folded and loaded condition while hanging from a haul rope.

FIG. 1E illustrates one example of additional features that may be included in the overlapping portions of the central portion 110, first side strip 124 of the first side portion 120 and/or the second side strip 134 of the second side portion 130 in order to further facilitate maintaining the first and second side compartments 122, 132 in a closed configuration when loaded. For example, the central portion 110 may include a first groove 150 and the first side strip 124 of the first side portion 120 may include a first ridge 152. The first groove 150 and the first ridge 152 may extend substantially parallel with a lengthwise extent of the belt 100 for at least a portion of the length of the belt 100, and in some embodiments, the entire length of the belt 100. The first groove 150 and the first ridge 152 may be respectively located on the central portion 110 and the first side portion 120 and may have corresponding cross-sectional profiles (e.g., semi-circular) such that the first ridge 152 seats within the first groove 150 when the first side strip 124 of the first side portion 120 overlaps the central portion 110.

By way of further example, the first side portion 120 may also include a second ridge 154. The second ridge 154 may extend substantially parallel with a lengthwise extent of the belt 100 for at least a portion of the length of the belt 100, and in some embodiments, the entire length of the belt 100. The second ridge 154 may be located on the first side portion 120 and may have a cross-sectional profile (e.g. semi-circular) such that the second ridge 154 may seat against a portion of the belt 100 where the belt 100 transitions from the first side portion 120 to the central portion 110 when the first side strip 124 of the first side portion 120 overlaps the central portion 110.

In another example, the first side strip 124 of the first side portion 120 may include a second groove 156 and the second side strip 134 of the second side portion 130 may include a third ridge 158. The second groove 156 and the third ridge 158 may extend substantially parallel with a lengthwise extent of the belt 100 for at least a portion of the length of the belt 100, and in some embodiments, the entire length of the belt 100. The second groove 156 and the third ridge 152 may be respectively located on the first side portion 120 and the second side portion 130 and may have corresponding cross-sectional profiles (e.g., semi-circular) such that the third ridge 158 seats within the second groove 156 when the second side strip 134 of the second side portion 130 overlaps the first side strip 124 of the first side portion 120.

In one more example, the second side portion 120 may also include a fourth ridge 160. The fourth ridge 160 may extend substantially parallel with a lengthwise extent of the belt 100 for at least a portion of the length of the belt 100, and in some embodiments, the entire length of the belt 100. The fourth ridge 160 may be located on the second side portion 130 and may have a cross-sectional profile (e.g. semi-circular) such that the fourth ridge 160 may seat against an outside edge of the first side strip 124 of the first side portion 120 when the second side strip 134 of the second side portion 130 overlaps the side strip 124 of the first side portion 120.

Figure 2:
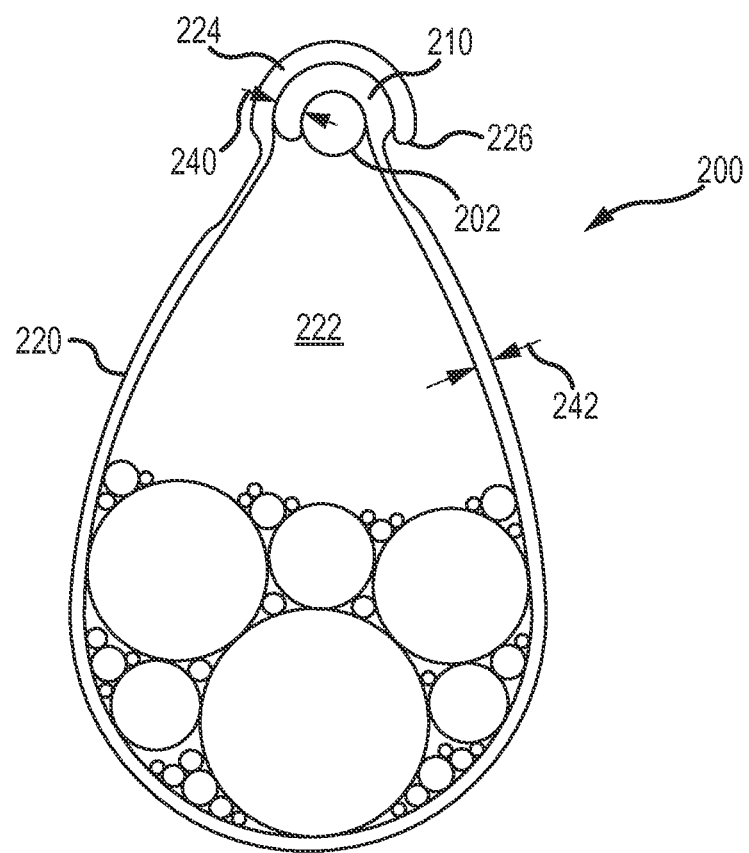
FIG. 2 is a cross-sectional view of one embodiment of a single compartment load carrying belt illustrated in a folded and loaded condition while hanging from a haul rope.

Referring to FIG. 2, one embodiment of a single compartment load carrying belt 200 that is fixable on a haul rope 202 includes a central portion 210 and a side portion 220. The central portion 210 is configured to substantially envelope at least a portion of the haul rope 202. In this regard, the central portion 210 may have a semicircular cross-sectional profile such that an upper portion of the haul rope 202 is receivable in a semi-circular opening defined by the semi-circular profile of the central portion 210.

The side portion 220 extends laterally away an edge of the central portion 210 of the load carrying belt 200. The side portion 220 is foldable toward the central portion 210 to form a load carrying compartment 222 (also referred to herein as the compartment 222) in which a quantity of material 204 is receivable. In this regard, a strip 224 of the side portion 220 proximal to an outside edge 226 of the side portion 220 may overlap at least a portion of the central portion 210 in order to provide the compartment 222 with a closed configuration. Providing a closed compartment 222 is advantageous for a variety of reasons, including, for example, the load carrying belt 200 itself reduces the likelihood of material being lost from the belt 200 during transport, reduces contamination of the surrounding air due to dust escaping from the material being transported, and reduces the introduction of undesired substances (e.g. water from rain or snow) into the transported material, all without the need to construct a cover structure over the load carrying belt 200.

The central portion 210 of the single compartment load carrying belt 200 may be of a different material than the side portion 210 of the single compartment load carrying belt 200 to provide the central portion 210 with extra strength (e.g., for when it passes around a sheave). The central portion 210 of the load carrying belt 200 may have a median thickness 240 that is greater than a median thickness 242 of the side portion 220 between the central portion 210 and the strip 224 proximal to the outside edge 226 of the side portion 220. The greater thickness 240 of the central portion 210 relative to the thickness 242 of the side portion 220 may enhance the strength of the central portion 210 as compared to the side portion 220. Enhancing the strength of the central portion 210 may be desirable because the load of the quantity of material 204 within the compartment 222 is concentrated where the central portion 210 contacts the haul rope 202. The reduced thickness 242 of the side portion 220 between the strip 224 relative to the central portion 210 may enhance the flexibility of the side portion 220 relative to the central portion 210. Enhancing the flexibility of the side portion 220 may facilitate folding of the side portion 220 to form the compartment 222.

As with the dual compartment load carrying belt 100 of FIGS. 1A-1E, when the side portion 220 is folded to form the compartment 222, the first side strip 124 may completely or nearly completely cover the central portion 210. Completely or nearly completely overlapping the central portion 210 with the side strip 224 facilitates maintaining the compartment 222 in a closed configuration when loaded with the quantity of material 204 by providing the largest possible contact area between the central portion 210 and the side strip 224. In other embodiments, such complete overlapping may not be necessary in order to maintain the compartment 222 in a closed configuration when loaded. Although not shown in FIG. 2, it is also possible to include corresponding grooves and ridges in the central portion 220 and side strip 224 of the side portion 220 such as those illustrated in FIG. 1E in order to further facilitate maintaining the compartment 222 in a closed configuration when loaded.

Figure 3A:
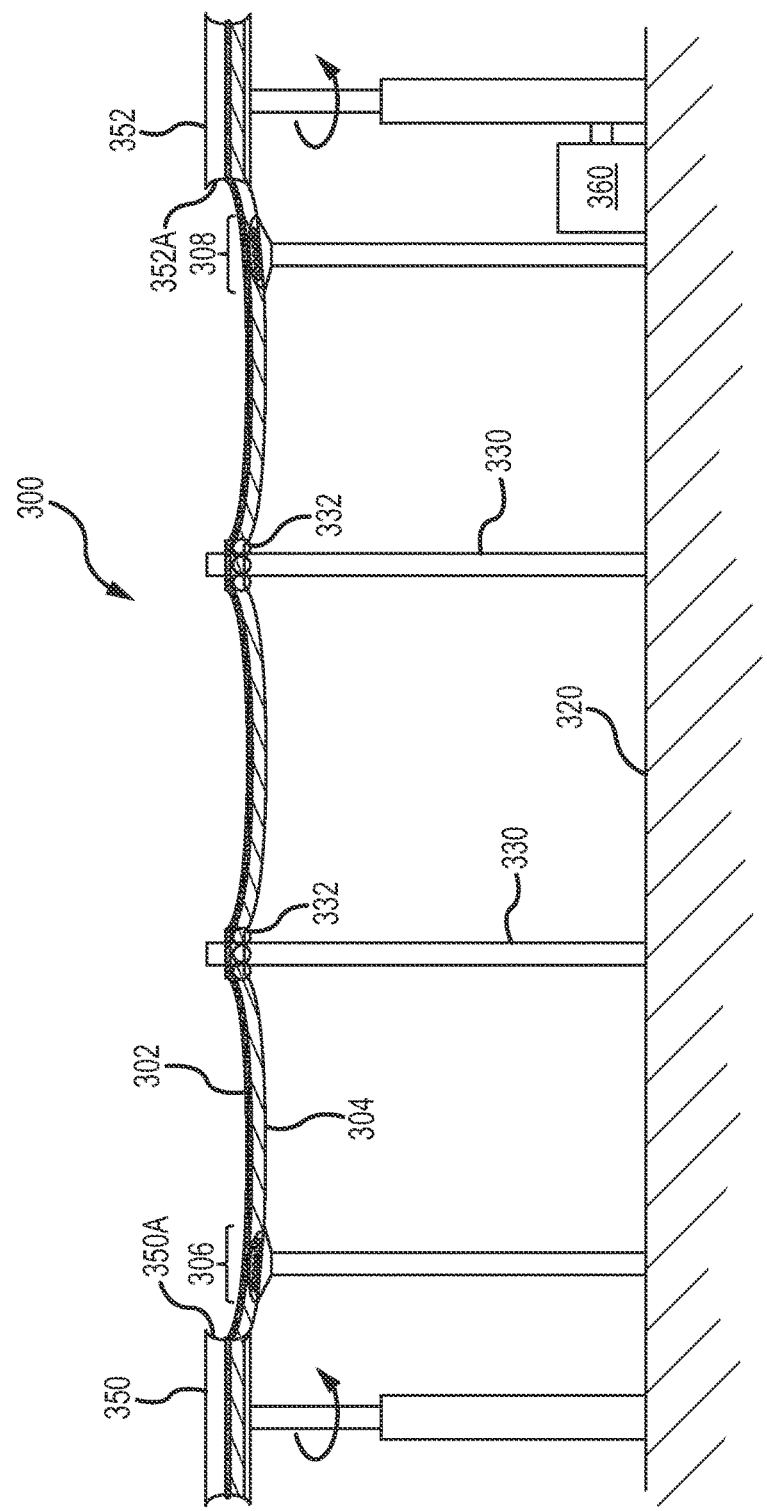
FIG. 3A shows one embodiment of a conveyor system employing a haul rope and a belt such as shown in FIGS. 1A-1E.

FIG. 3A shows one embodiment of a conveyor system 300. The conveyor system of FIG. 3A is depicted installed in an overland situation, but it could also be utilized the transport material over water as well. The conveyor system 300 includes a haul rope 302 and a load carrying belt 304 (e.g., a dual compartment load carrying belt 100 such as illustrated in FIGS. 1A-1E) hanging from the haul rope 302 in order to transport material from a loading zone 306 to an unloading zone 308 above the surface of the ground 320. In this regard, the compartment(s) of the load carrying belt 304 may be in an open configuration in the loading zone 306 to permit a quantity of material to be loaded within the compartment(s), in a closed configuration between the loading and unloading zones 306, 308, and in an open configuration within the unloading zone 308 to permit the quantity of material to be emptied from the compartment(s). In an embodiment such as shown in FIG. 3A, there is only one loading zone 306 and one unloading zone 308 over the course of the conveyor system 300. In other embodiments, there may be more than one loading zone 306 and/or more than one unloading zone 308 over the course of the conveyor system 300. Additionally, an unloading zone 308 may also serve as a loading zone 306 and vice versa in order to allow for backhauling of material. For example, in a mining operation, ore bearing rock may be hauled overland using the conveyor system 300 from a mine location to a processing facility and waste rock may be returned from the processing facility to the mine location using the same conveyor system 300.

The conveyor system 300 may include a plurality of support towers 330. Each support tower 330 may include one or more support wheel assemblies 332 that support the haul rope 302 from which the load carrying belt 304 hangs above the surface of the ground 320. At either end of the conveyor system 300 are rotatable end sheaves 350, 352 which change the direction of the haul rope 302 and load carrying belt 304 hanging therefrom. In this regard, the haul rope 302 may contact a rim 350A, 352A of each end sheave 350, 352 with sufficient friction between the rim 350A, 352A and haul rope 302 such that rotation of one of the end sheaves 350, 352 under power of a drive motor 360 coupled therewith pulls the haul rope 302 to continuously move portions of the haul rope 302 and belt 304 hanging from the haul rope 302 from the loading zone 306 to the unloading zone 308. The support towers 330 may be spaced apart as needed between the first and second end sheaves 350, 352 based on factors such as the terrain and an amount of sag anticipated in the haul rope 302 due to the weight of the haul rope 302, the belt 304 and material being transported.

Figure 3B:
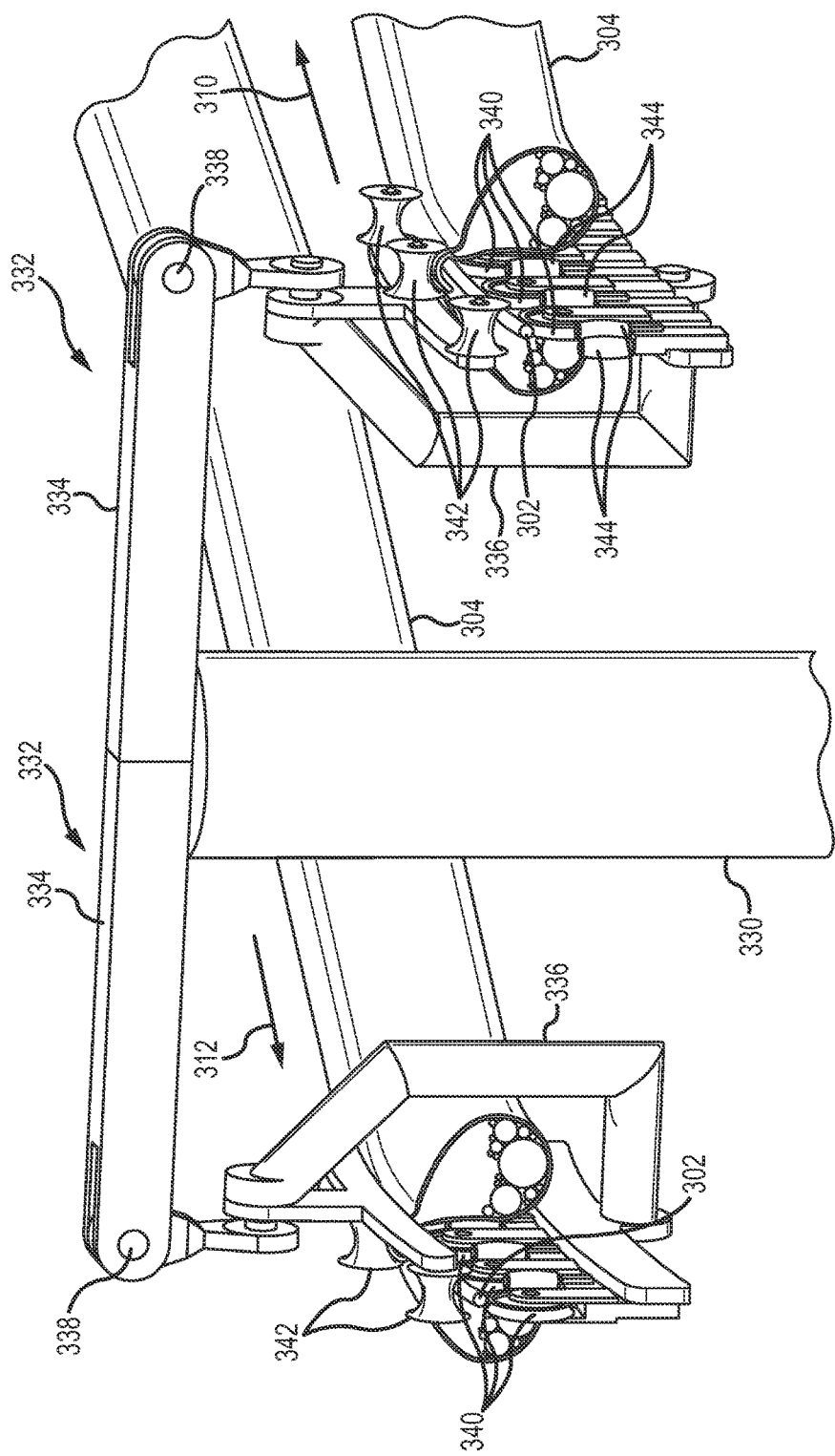
FIG. 3B shows one embodiment of a support wheel arrangement that may be included one or more of the support towers of the conveyor system of FIG. 3A.

FIG. 3B shows one embodiment of a support wheel assembly 332 that may on one or more of the intermediary support towers 330 to support the haul rope 302 and belt 304 hanging therefrom above the surface of the ground 320. A pair of similarly configured support wheel assemblies 332 may be provided on the support tower 330 to support both the forward direction (indicated by arrow 310) and the return direction (indicated by arrow 312) of the haul rope 302 and belt 304. The support wheel arrangement 332 includes a support bar 334 extending laterally from the tower 330. A free hanging support arm 336 which may generally be c-shaped hangs from a hinge 338 at the end of the laterally extending support bar 334. One or more support wheels 340 are supported by the free hanging support arm 336 beneath the haul rope 302. As illustrated in FIG. 3B, in the case of the belt 302 being a dual compartment belt 100 such as shown in FIGS. 1A-1E, the support wheel(s) 340 may be positioned between the first and second side compartments 122, 132 defined by the folded first and second side portions 120, 130 of the belt 100.

The haul rope 302 rides on the support wheel(s) 340 which are free to turn on axles thereof as the haul rope 302 and belt 304 hanging therefrom are pulled past the support tower 300. To help facilitate keeping the haul rope 302 on the support wheel(s) 340, one or more top rollers 342 may hang from a top of the free hanging support arm 336 to apply downward pressure on a top of the belt 302 overlying the haul rope 302. The free hanging support arm 336 may also support one or more pairs of separation rollers 344. Each one of a pair of the separation rollers 344 may be oriented generally vertically on either side of the support wheel(s) 340 with axes thereof generally transverse to the axles of the support wheels 340. The separation rollers 344 function to separate the load carrying compartments 122, 132 of the belt 302 around the support wheels 340 to prevent dragging of the side portions of the belt 302 against the side of the support wheels 340.

Figure 3C:
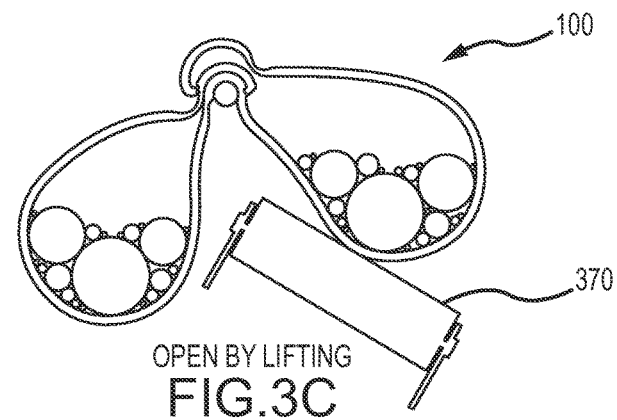
FIGS. 3C-E illustrate one manner of opening compartments of a dual compartment belt within loading and unloading zones of a conveyor system.
Figure 3D:
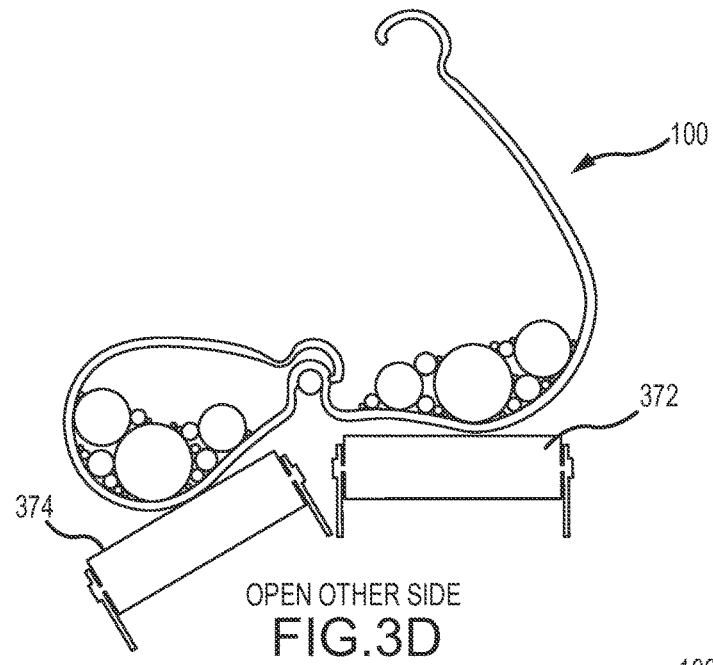
Figure 3E:
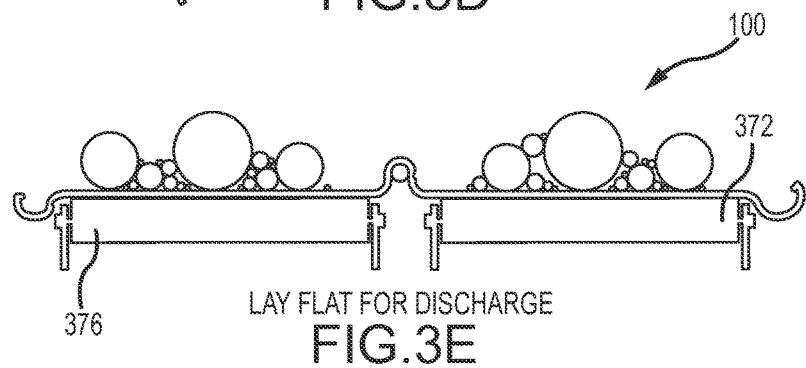

FIGS. 3C-E illustrate one manner of opening the compartments 122, 132 of a dual compartment belt 100 such as shown in FIGS. 1A-1E within the loading and unloading zones 306, 308 of the conveyor system 300. Initially, a first angled lift roller 370 (or a first series of angled lift rollers 370) positioned underneath and to one side of the haul rope 302 contact the second side compartment 132 of the belt 100. The first lift roller(s) 370 lifts the second side portion 132 of the belt 100 thereby disengaging the second side strip 134 from the first side strip 124 causing the second side portion 120 to unfold and lay flat supported on a first flat support roller 372 (or a first series of flat support rollers 372). This exposes the second quantity of material 106 for discharge, or in the case of an already unloaded belt, introduction of the second quantity of material 106. In this regard, each lift roller 370 in the first series of lift rollers 370 may be oriented at progressively decreasing angles relative to a generally horizontal orientation to transition the second side portion 130 of the belt 100 from closed to open and laying flat on the first flat roller(s) 372.

After the second side compartment 132 is opened, a second angled lift roller 374 (or a second series of angled lift rollers 374) positioned underneath and to other side of the haul rope 302 contact the first side compartment 122 of the belt 100. The second lift roller(s) 374 lifts the first side portion 122 of the belt 100 thereby disengaging the first side strip 124 from the central portion 110 causing the first side portion 120 to unfold and lay flat supported on a second flat support roller 376 (or a second series of flat support rollers 376). This exposes the first quantity of material 104 for discharge, or in the case of an already unloaded belt, introduction of the first quantity of material 104. In this regard, each lift roller 374 in the second series of lift rollers 374 may be oriented at progressively decreasing angles relative to a generally horizontal orientation to transition the first side portion 120 of the belt 100 from closed to open and laying flat on the second flat roller(s) 376.

Although not illustrated, a single compartment belt 200 such as shown in FIG. 2 may be opened and supported in a similar manner by using, for example, the first angled lift roller 370 (or first series of angled lift rollers 370) followed by the first flat roller 372 (or first series of flat rollers 372) or the second angled lift roller 374 (or second series of angled lift rollers 374) followed by the second flat roller 376 (or second series of flat rollers 376) depending upon which side of the haul rope 302 the single compartment is located on.

Furthermore, the compartment(s) may be closed upon transitioning from the loading and unloading zones 306, 308 of the conveyor system 300 by using one or more series of one or more angled closing rollers. In this regard, the angled closing rollers may be oriented at progressively increasing angles relative to a generally horizontal orientation as the haul rope 302 and belt 300 exit the loading and unloading zones 306, 308.

FIG. 4A shows one embodiment of a conveyor system 400 that is particularly suited for a single compartment load carrying belt 200 such as illustrated in FIG. 2. However, a dual compartment load carrying belt 100 such as shown in FIGS. 1A-1E may also be utilized in the conveyor system 400 of FIG. 4A. The conveyor system 400 includes a haul rope 402 and a load carrying belt 404 (e.g., a single compartment load carrying belt 200 such as illustrated in FIG. 2) hanging from the haul rope 402 in order to transport material from a loading zone 406 to an unloading zone 408 above the surface of the ground 420. In this regard, the compartment(s) of the load carrying belt 404 may be in an open configuration in the loading zone 406 to permit a quantity of material to be loaded within the compartment(s), in a closed configuration between the loading and unloading zones 406, 408, and in an open configuration within the unloading zone 408 to permit the quantity of material to be emptied from the compartment(s).

Figure 4B:
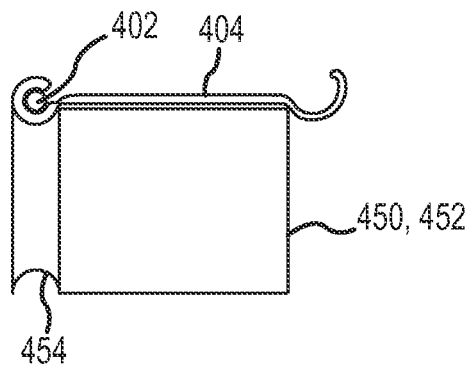
FIG. 4B shows a side view of an end sheave drum that may be used in the conveyor system of FIG. 4A.

At either end of the conveyor system 400 are rotatable end sheave drums 450, 452 around which the haul rope 402 and load carrying belt 404 are wrapped. When the belt 404 is unfolded and open it may contact the surface of the drums 450, 452 such as shown in FIG. 4B. In this regard, a side portion of the belt may generally contact a flat side surface of the end sheave drum 450 or 452 and a central portion of the belt 404 enveloping the haul rope 402 may fit within a grooved sheave rim 454 formed on the side surface of the end sheave drum 450 or 452 proximal to one end thereof. The unfolded belt 404 may contact the surface of the end sheave drum 450 or 452 with sufficient frictional force such that rotation of one of the end sheave drums 450, 452 under power of a drive motor 460 coupled therewith pulls the haul rope 402 and belt 404 to continuously move portions of the haul rope 402 and belt 404 in the direction of arrow 410 (e.g. a delivery direction) from the loading zone 406 to the unloading zone 408 and back in the direction of arrow 412 (e.g. a return direction).

Figure 4C:
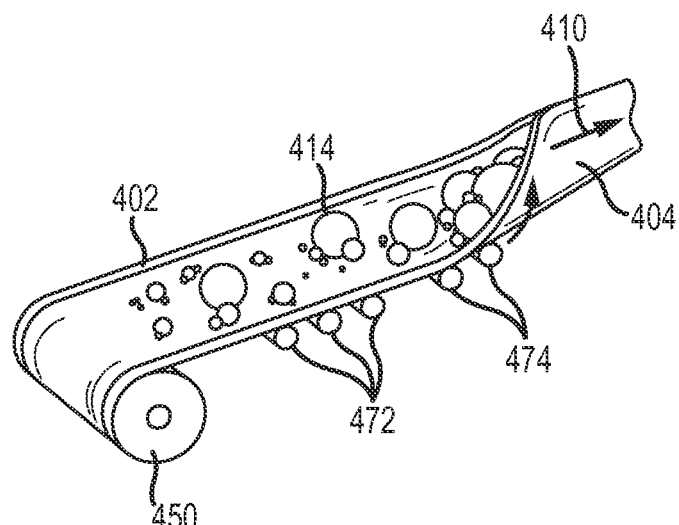
FIG. 4C shows an enlarged view of an end sheave drum and closing roller arrangement of the conveyor system of FIG. 4A.
Figure 4D:
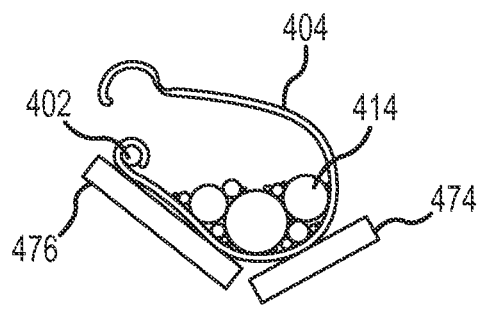
FIG. 4D shows a cross-sectional view of the closing roller arrangement of the conveyor system of FIG. 4A.
Figure 5A:
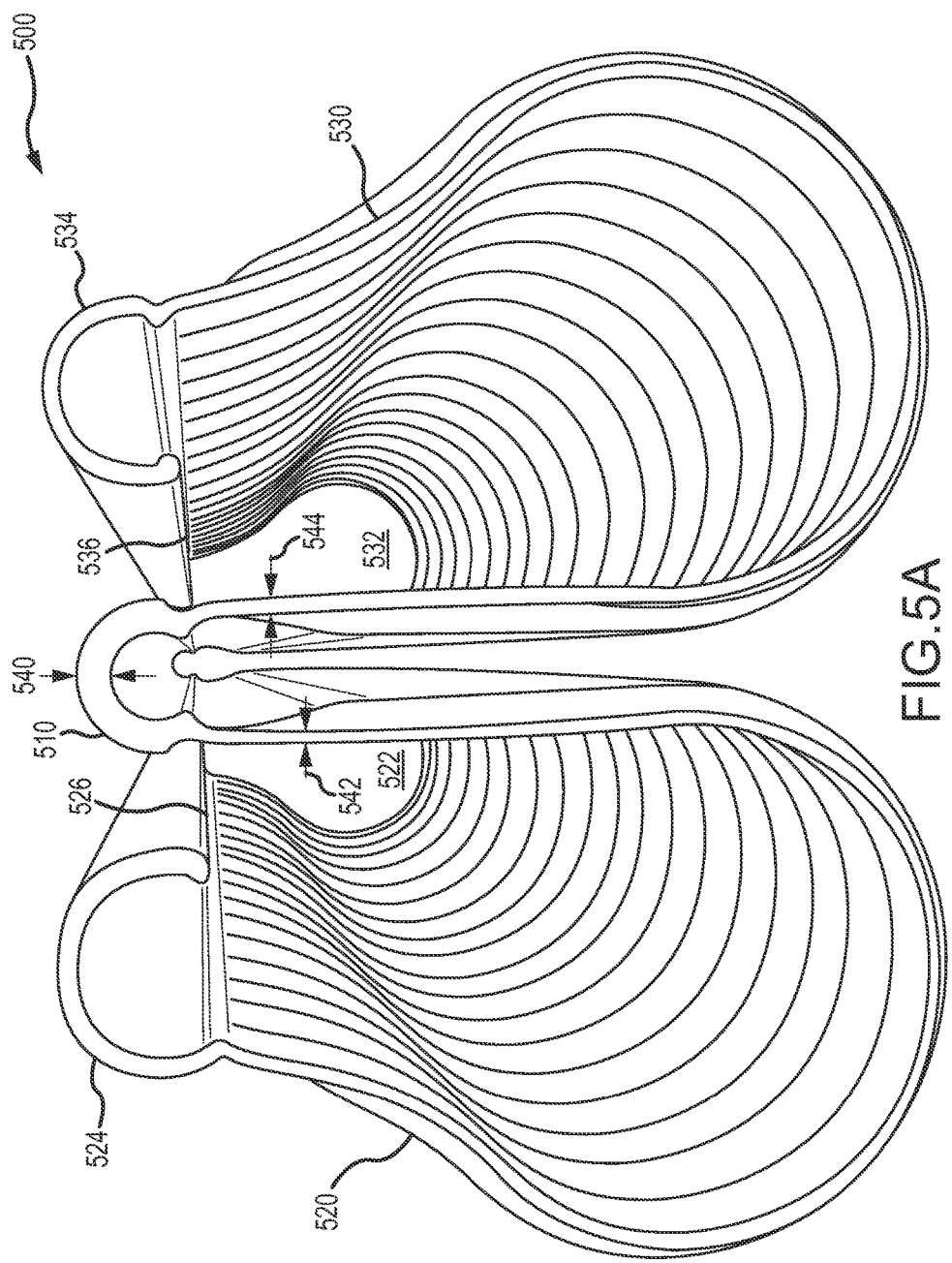
FIG. 5A is a cross-sectional perspective view of one embodiment of a corrugated dual compartment load carrying belt illustrated in a partially folded and unloaded condition.
Figure 5C:
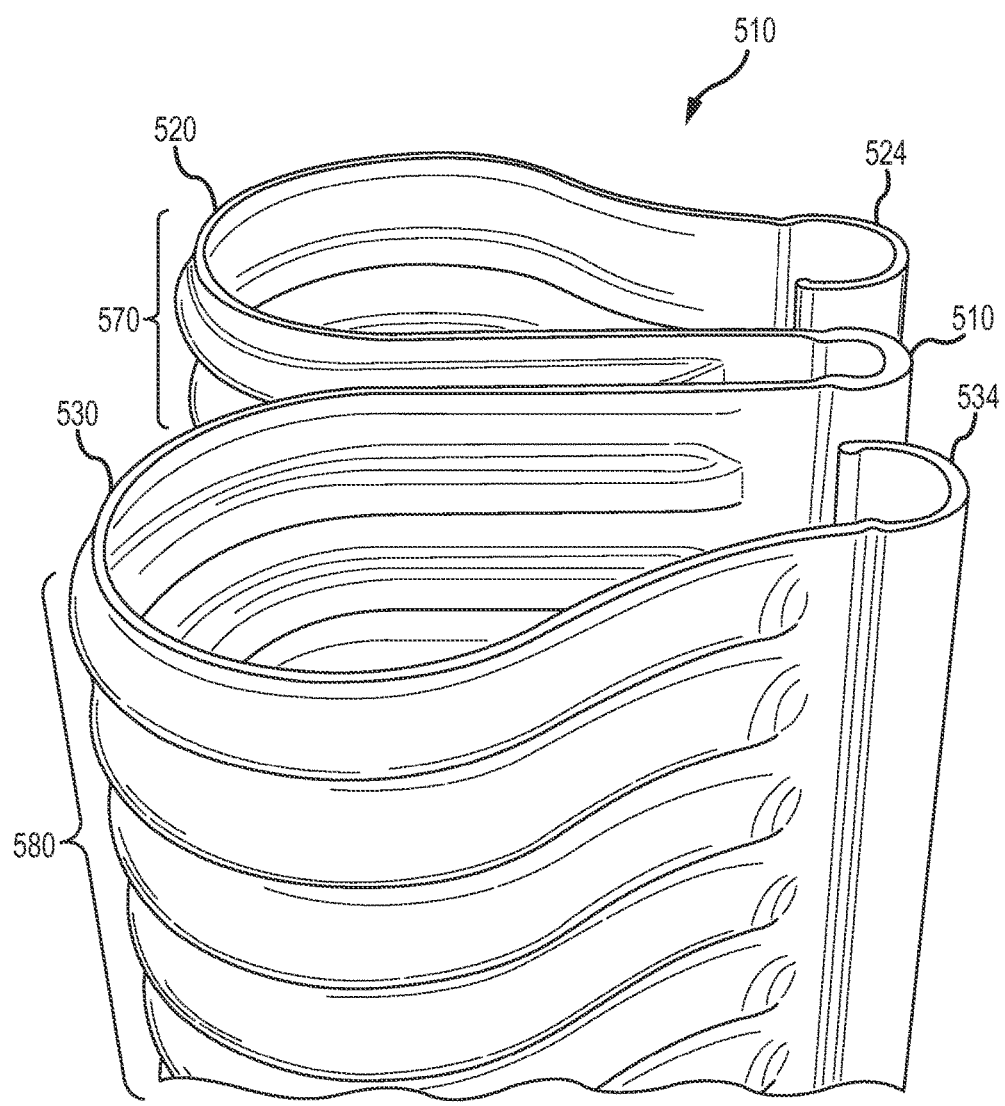
FIG. 5C is another side perspective view of the corrugated dual compartment load carrying belt of FIG. 5A.
Figure 5D:
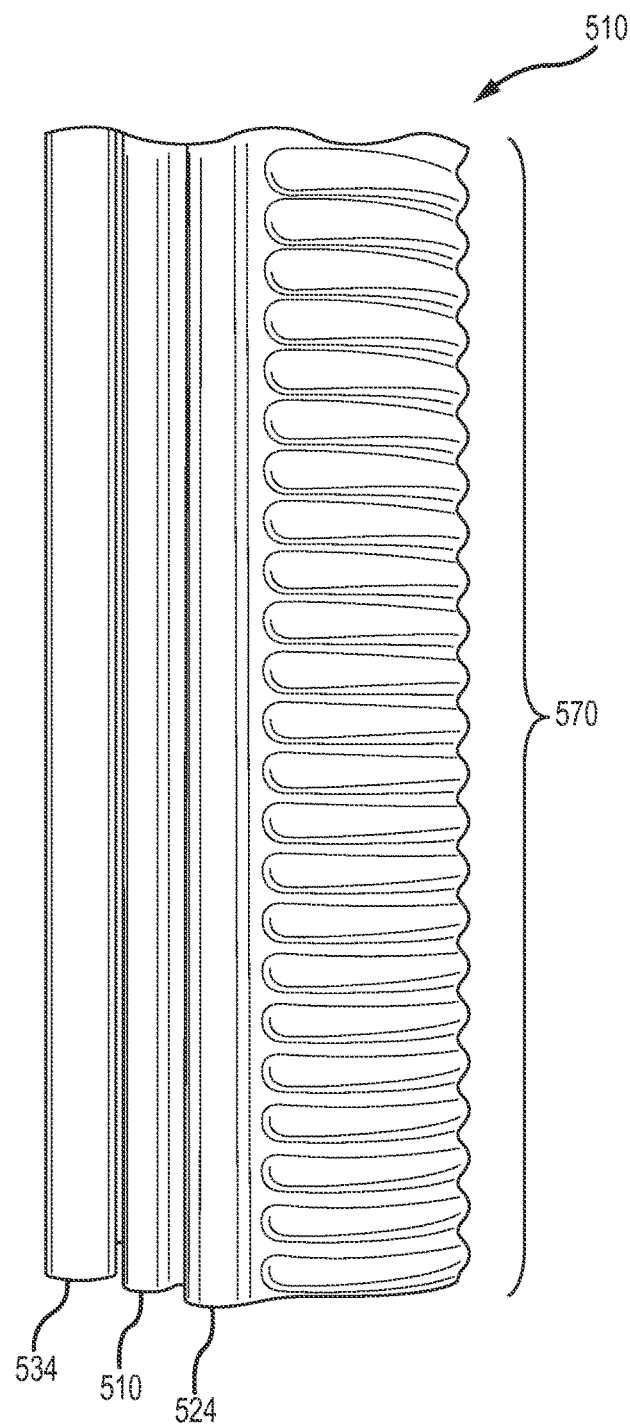
FIG. 5D is a side view of the corrugated dual compartment load carrying belt of FIG. 5A.

FIG. 4C shows an enlarged view the loading zone 406 wherein material may be loaded onto the open belt 404 and the belt 404 may be closed as it exits the loading zone 406. In this regard, the opened belt 404 may be supported by a series of one or more flat support rollers 472 oriented in a generally horizontal orientation (e.g. with their axes of rotation aligned with a rotational axis of the end sheave drum 450). As the belt 404 exits the loading zone 406, the support rollers may transition to a series of one or more pairs of angled support rollers 474, 476 having rotation axes angled with respect to the rotation axis of the end sheave drum 450. The respective angles of the pairs of angled support rollers 474, 476 may increase proceeding away from the end sheave drum 450 in order to directing folding of the side portion of the belt 404 toward the central portion of the belt 404 and haul rope 402 closing the belt 404 onto itself and enclosing the loaded material within a compartment provided by the closed belt 404. FIG. 4D illustrates one such pair of angled support rollers 474, 476 directing folding of the belt 404 onto itself to enclose a quantity of material 414. The belt 404 may be opened in the unloading zone 408 by a similarly configured series of one or more angled support rollers 474, 476 transitioning to a series of one or more flat support rollers 472 prior to end sheave drum 452. The belt 404 may return to the first end sheave drum 450 in an open configuration. In this regard, if the conveyor system 400 is to be employed for backhauling material, then the direction of rotation of the end sheave drums 450, 452 and hence movement of the haul rope/belt 402, 404 may reversed and the unloading zone 408 becomes the loading zone and the loading zone 406 becomes the unloading zone.

Unlike the conveyor system 300 of FIG. 3A, the conveyor system 400 of FIG. 4A does not include any mid-span supports between the loading and unloading zones 406, 408. As such, the conveyor system 400 of FIG. 4A is particularly suited for in-plant situations and the like where shorter transportation distances are involved. However, given suitable haul rope 402 strength, conveyor system 400 could be deployed in overland/over water situations where longer transportation distances might be required. Given the shorter distances involved, only one loading zone 406 and one unloading zone 408 over the course of the conveyor system 400 is typically contemplated. However, the unloading zone 408 may also serve as a loading zone 406 and vice versa in order to allow for backhauling of material.

Since there are no mid-span supports in the conveyor system 400 of FIG. 4A, the loaded and unloaded portions of the belt 404 may sag by differing amounts due to different tension in the delivery and return sections of the haul rope 402/belt 404. Depending upon distances between the end sheave drums 450, 452, this differing sag/tension may result in undesirable slippage of the haul rope/belt 402, 404 on the end sheave drums 450, 452. In some embodiments, a tensioning system 470 may be included on the return (unloaded) side of the conveyor system 400 in order to keep the return portion of the haul rope/belt 402, 404 under sufficient tension thereby reducing possible slippage of the haul rope/belt 402, 404 on the end sheave drums 450, 452.

Referring the FIGS. 5A-5D, one embodiment of a corrugated dual compartment load carrying belt 500 that is fixable on a haul rope (not shown in FIGS. 5A-5D) may be configured similarly to the dual compartment load carrying belts such as shown in FIGS. 1A-1E. In this regard, the corrugated dual compartment load carrying belt 500 includes a central portion 510, a first side portion 520 and a second side portion 530. The central portion 510 is configured to substantially envelope at least a portion of a haul rope. In this regard, the central portion 510 may have a semicircular cross-sectional profile such that an upper portion of a haul rope is receivable in a semi-circular opening defined by the semi-circular profile of the central portion 510.

The first and second side portions 520, 530 extend laterally away from respective opposing edges of the central portion 510 of the load carrying belt 500. The first side portion 520 is foldable toward the central portion 510 to form a first side load carrying compartment 522 (also referred to herein as the first compartment 522) in which a first quantity of material (not shown in FIGS. 5A-5D) is receivable, and the second side portion 530 is foldable toward the central portion 510 to form a second side load carrying compartment 532 (also referred to herein as the second compartment 532) in which a second quantity of material (not shown in FIGS. 5A-5D) is receivable. In this regard, a strip 524 of the first side portion 520 proximal to an outside edge 526 of the first side portion 520 may be configured to overlap at least a portion of the central portion 510, and a strip 534 of the second side portion 530 proximal to an outside edge 536 of the second side portion 530 may be configured to overlap at least a portion of the strip 524 of the first side portion 520 overlapping at least a portion of the central portion 510 in order to provide the first and second compartments 522, 532 with a closed configuration thereby achieving the benefits of having closed load carrying compartment(s). Although not readily seen in the perspective views of FIGS. 5A-5D, it is also possible to include corresponding grooves and ridges it the central portion 510 and strips 524, 534 of the first and second side portions 520, 530 such as those illustrated in FIG. 1E in order to further facilitate maintaining the first and second compartments 522, 532 in closed configurations when loaded.

As with the load carrying belts of FIGS. 1A-1E, the central portion 510 of the load carrying belt 500 may have a median thickness 540 that is greater than a median thickness 542 of the first side portion 520 between the central portion 510 and the strip 524 proximal to outside edge 526 of the first side portion 520 and also greater than a median thickness 544 of the second side portion 530 between the central portion 510 and the strip 534 proximal to outside edge 536 of the second side portion 530. The greater thickness 540 of the central portion 510 relative to the thicknesses 542, 544 of the first and second side portions 520, 530, and the reduced thicknesses 542, 544 of the first and second side portions 520, 530 between the respective strips 524, 526 relative to the central portion 510 achieves the previously mentioned benefits of having enhanced strength of the belt 500 where needed and enhanced flexibility of the belt 500 where needed.

The reduced thicknesses 542, 544 of the first and second side portions 520, 530 relative to the thickness 540 of the central portion 510 of the belt 500 primarily provides flexibility that facilitates folding of the first and second side portions 520, 530 of the belt 500 to form the first and second compartments 522, 532 and subsequent unfolding of the first and second side portions 520, 530 to unload material from the first and second compartments 522, 532. While this may also provide the belt 500 with sufficient flexibility along its lengthwise extent for traversing a conveyor system 300 such as shown in FIGS. 3A-3E, in some instances, the flexibility of a load carrying belt such as may need to be further enhanced along its lengthwise extent without compromising the load carrying capabilities of the belt. For example, in some conveyor system implementations utilizing a load carrying belt, the belt may need to traverse one or more drums which change the direction of the belt (e.g., prior to a loading zone or after an unloading zone). Where additional belt flexibility is desired, corrugations formed in the belt may provide such enhanced flexibility.

For example, as shown in FIGS. 5A-5D, a first plurality of corrugations 570 may be formed in the first side portion 520 of the belt 500 and a second plurality of corrugations 580 may be formed in the second side portion 530 of the belt 500. The corrugations 570, 580 may be aligned transverse to a lengthwise extent of the central portion 510 of the belt 500, and, more particularly, may be aligned substantially perpendicular to the lengthwise extent of the central portion 510. In one embodiment, the corrugations 570 formed in the first side portion 520 may extend laterally from a boundary between the central portion 510 of the belt 500 and the first side portion 520 to the non-corrugated strip 524 proximal to the outside edge 526 of the first side portion 520, and the corrugations 580 formed in the second side portion 530 may extend laterally from a boundary between the central portion 510 of the belt 500 and the second side portion 530 to the non-corrugated strip 534 proximal to the outside edge 536 of the second side portion 530. In other embodiments, one or more of the corrugations 570, 580 may begin in a spaced relation from the boundary between the central portion 510 and the respective side portions 520, 530, and one or more of the corrugations 570, 580 may not extend all the way to the respective non-corrugated strips 524, 534 proximal to respective outside edges 526, 536 of respective first and second side portions 520, 530. Furthermore, in some embodiments, one or more of the corrugations 570, 580 may be discontinuous along its extent between the central portion 510 and respective non-corrugated strips 524, 534. Additionally, in some embodiments, the corrugations 570, 580 may continue into the central portion 510 of the belt 500 and/or all the way to respective outside edges 526, 536 of respective first and second side portions 520, 530.

The number of corrugations 570, 580 over a specified length of the belt 500 may be varied between different belts in order to provide different belts 500 with varying degrees of flexibility. For example, in one embodiment, the first side portion 520 of the belt 500 may include at least five corrugations 570 per meter of belt 500, and the second side portion 530 of the belt 500 may include at least five corrugations 580 per meter of belt 500. In other embodiments, the optimum number of corrugations per meter of belt 500 may be more or less than five. Additionally, the depth and/or the cross-sectional shape of the corrugations may also be configured in order to provide the belt 500 with varying degrees of flexibility.

Additionally, as shown in FIGS. 5A-5D, the number of corrugations 570, 580 formed in respective first and second side portions 520, 530 over a specified length of the belt 500 may be the same or substantially the same. In other embodiments, the number of corrugations 570, 580 formed in respective first and second side portions 520, 530 over a specified length of the belt 500 may be different in order to provide the first and second side portions 520, 530 of the belt 500 with differing flexibility characteristics.

It should be noted that although only a corrugated dual compartment load carrying belt 500 has be depicted and described herein, a plurality of corrugations may also be formed in the side portion of a single compartment load carrying belt such as illustrated in FIG. 2. The corrugations may be aligned transverse to a lengthwise extent of the central portion of the belt, and, more particularly, may be aligned substantially perpendicular to the lengthwise extent of the central portion. In one embodiment, the corrugations formed in the side portion may extend laterally from a boundary between the central portion of the belt and the side portion to a non-corrugated strip proximal to an outside edge of the side portion. In other embodiments, one or more of the corrugations may begin in spaced relation from the boundary between the central portion and the side portion, and one or more of the corrugations may not extend all the way to the non-corrugated strip on the outside edge of the side portion. Furthermore, in some embodiments, one or more of the corrugations may be discontinuous along its extent between the central portion and the non-corrugated strip. Additionally, in some embodiments, the corrugations may continue into the central portion of the belt and/or all the way to the outside edge of the side portion. By including corrugations in a single compartment load carrying belt, flexibility of a single compartment load carrying belt may be enhanced thereby enhancing its suitability for various conveyor systems such as, for example, conveyor systems including direction changing drum rollers and the like. In this regard, it may be desirable to include at least five corrugations per meter of belt.

FIGS. 6A-6F show portions of another embodiment of a conveyor system 600. The conveyor system of FIGS. 6A-6F is particularly suited for a load carrying belt 100 such as illustrated in FIGS. 1A-1E. The conveyor system 600 may also employ a corrugated dual compartment load carrying belt 500 such as illustrated in FIGS. 5A-5D.

The conveyor system 600 includes a haul rope 602 and a load carrying belt 604 (e.g., a non-corrugated dual compartment load carrying belt 100 such as illustrated in FIGS. 1A-1E) hanging from the haul rope 602 in order to transport material from a loading zone (not shown in FIG. 6B) to an unloading zone 608. In this regard, the compartments of the load carrying belt 604 may be in an open configuration in the loading zone to permit a quantity of material to be loaded within the compartments, in a closed configuration between the loading and unloading zones, and in an open configuration within the unloading zone 608 to permit the quantity of material to be emptied from the compartments. In an embodiment such as shown in FIGS. 6A-6F, there is only one loading zone and one unloading zone 606 over the course of the conveyor system 600. In other embodiments, there may be more than one loading zone and/or more than one unloading zone 608 over the course of the conveyor system 600. Additionally, an unloading zone 608 may also serve as a loading zone and vice versa in order to allow for backhauling of material.

The conveyor system 600 may include a plurality of support towers 630. The support towers 630 may be spaced apart as needed based on factors such as the terrain and an amount of sag anticipated in the haul rope 602 due to the weight of the haul rope 602, the belt 604 and material being transported. Each support tower 630 may include one or more support wheel assemblies 632 that support the haul rope 602 from which the load carrying belt 604 hangs. A pair of similarly configured support wheel assemblies 632 may be provided on each support tower 630 to support both the forward direction (indicated by arrow 610) and the return direction (indicated by arrow 612) of the haul rope 602 and belt 604.

The support wheel assembly 632 includes a support bar 634 extending laterally from the tower 630. A free hanging support arm 636 which may generally be c-shaped hangs from a hinge 638 at the end of the laterally extending support bar 634. One or more support wheels 640 are supported by the free hanging support arm 636 beneath the haul rope 602. In FIG. 6A, the support wheels 640 are obscured from view by the compartments of the load carrying belt 604. In this regard, the support wheel(s) 640 may be positioned between the first and second side compartments defined by the folded first and second side portions of the belt 600.

The haul rope 602 rides on the support wheel(s) 640 which are free to turn on axles thereof as the haul rope 602 and belt 604 hanging therefrom are pulled past the support tower 600. To help facilitate keeping the haul rope 602 on the support wheel(s) 640, one or more top rollers 642 may hang from a top of the free hanging support arm 636 to apply downward pressure on a top of the belt 602 overlying the haul rope 602. Although not shown in FIGS. 6A-6B, the free hanging support arm 636 may also support one or more pairs of separation rollers such as shown in FIG. 3B.

Figure 6B:
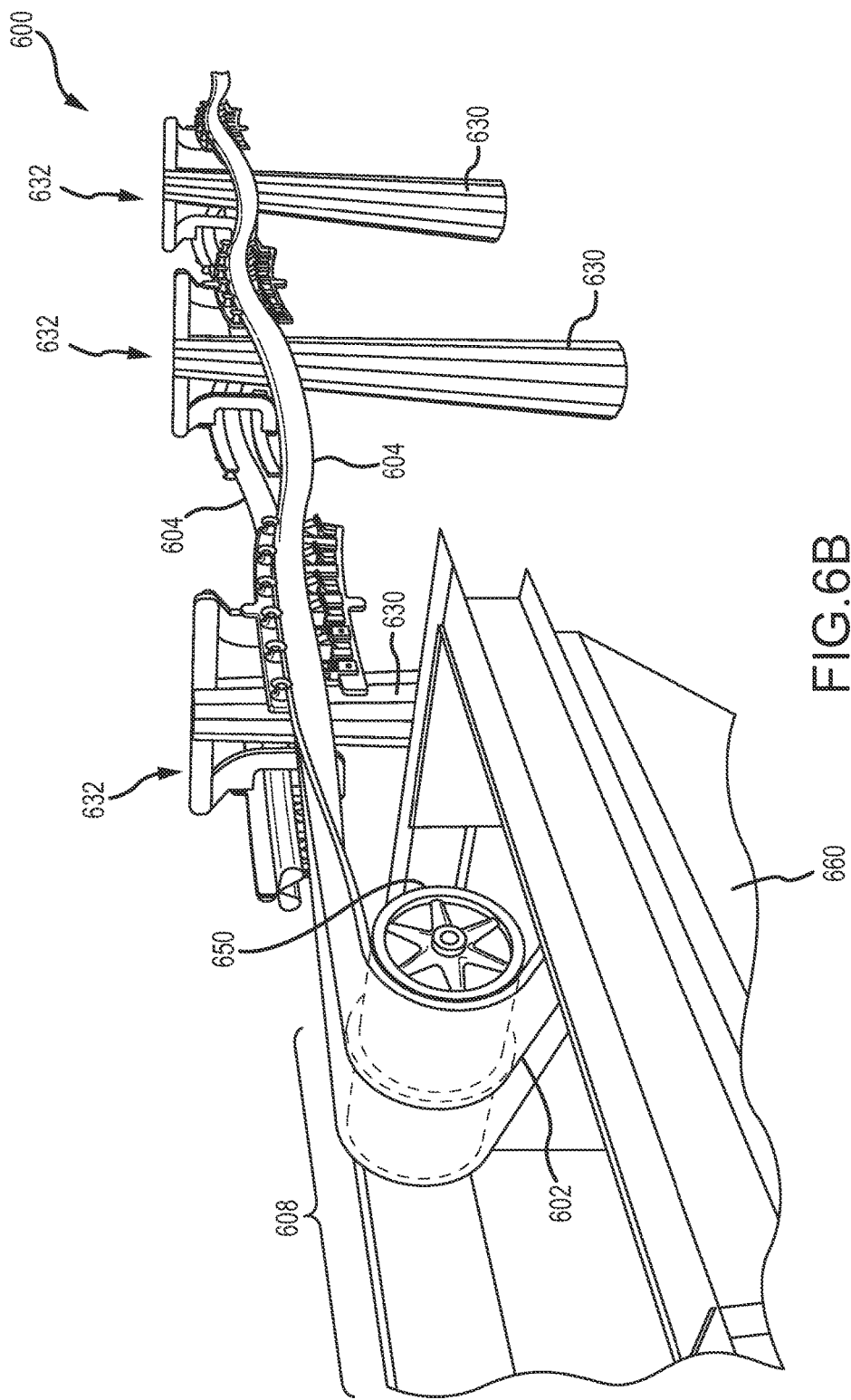

At either end of the conveyor system 600 are rotatable end sheaves. In the conveyor system 600 of FIGS. 6A-6F, one or more of the rotatable end sheaves may be in the form of a drum 650 such as shown in FIG. 6B. As seen in FIG. 6B, the belt 604 begins transitioning from a completely folded configuration to an unfolded configuration as it enters the unloading zone 608, and when it reaches the drum 650 it is completely unfolded allowing material stored in the compartments to be released (e.g., into a hopper structure 660) as the belt 604 changes direction at the drum 650. In this regard, the drum 650 may have a dimension 690 between ends of the drum 650 that is at least the width of the un-folded load carrying belt 604.

The drum 650 changes the direction of the haul rope 602 and load carrying belt 604 hanging therefrom. In this regard, the haul rope 602 and/or the unfolded load carrying belt 604 may contact the surface of the drum 650 with sufficient friction between the surface of the drum 650 and the haul rope 602 and/or the unfolded load carrying belt 604 such that rotation of the drum 650 under power of a drive motor (not shown in FIGS. 6A-6B) coupled therewith pulls the haul rope 602 to continuously move portions of the haul rope 602 and belt 604 hanging from the haul rope 602 from the loading zone to the unloading zone 608.

The conveyor system may also include an opening forming roller and wheel structure 680 (not shown in FIGS. 6A-6B). The opening forming roller and wheel structure 680 may be positioned proximal to the unloading zone 608 and assists in transitioning the belt 604 from a completely folded configuration to an unfolded configuration. A closing forming roller and wheel structure (not shown) similarly configured to the opening forming roller and wheel structure 680 may be positioned proximal to a loading zone (not shown) to assist in transitioning the belt 604 from an open configuration to a closed configuration as the belt 604 leaves the loading zone.

Figure 6C:
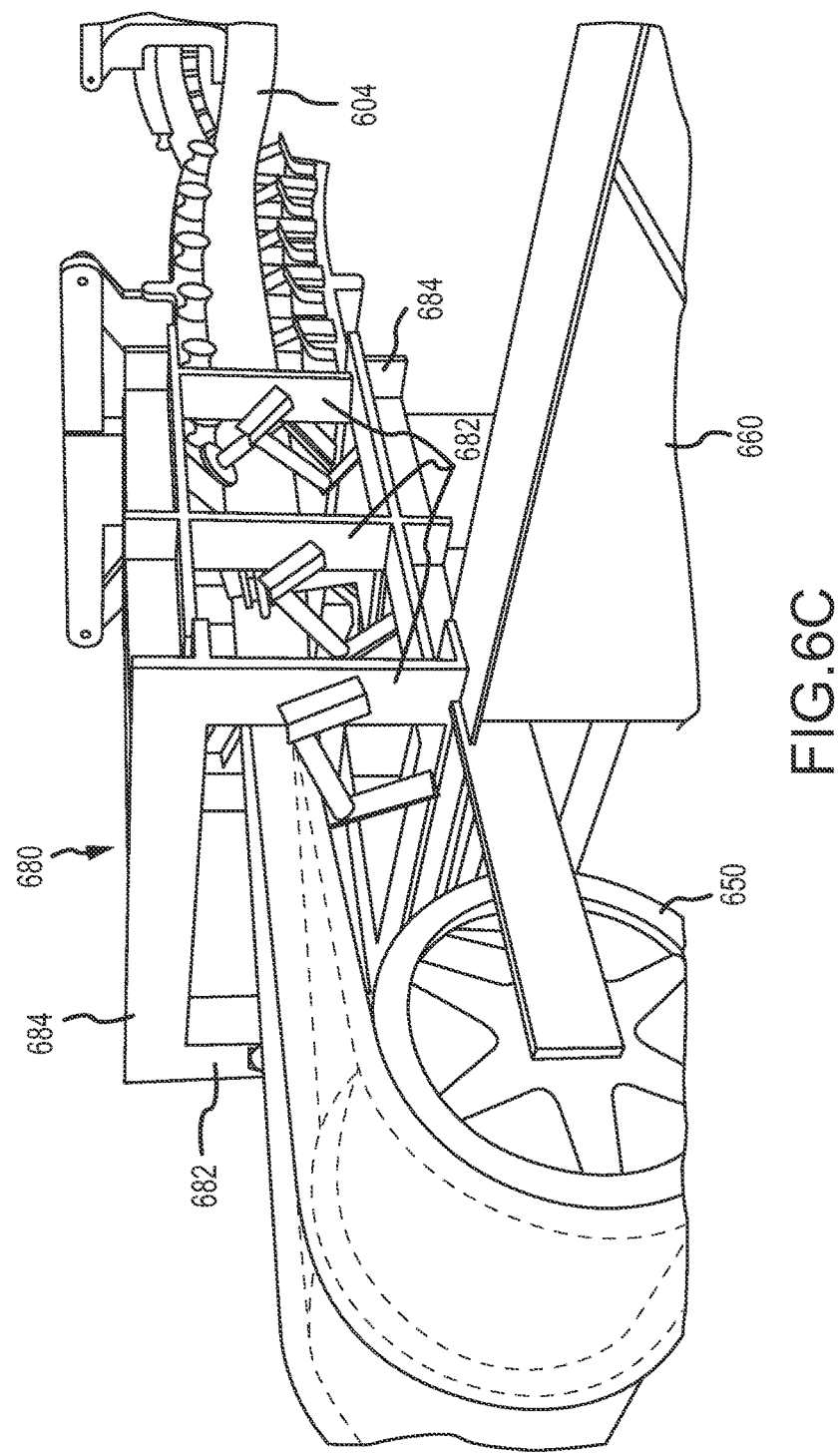
Figure 6D:
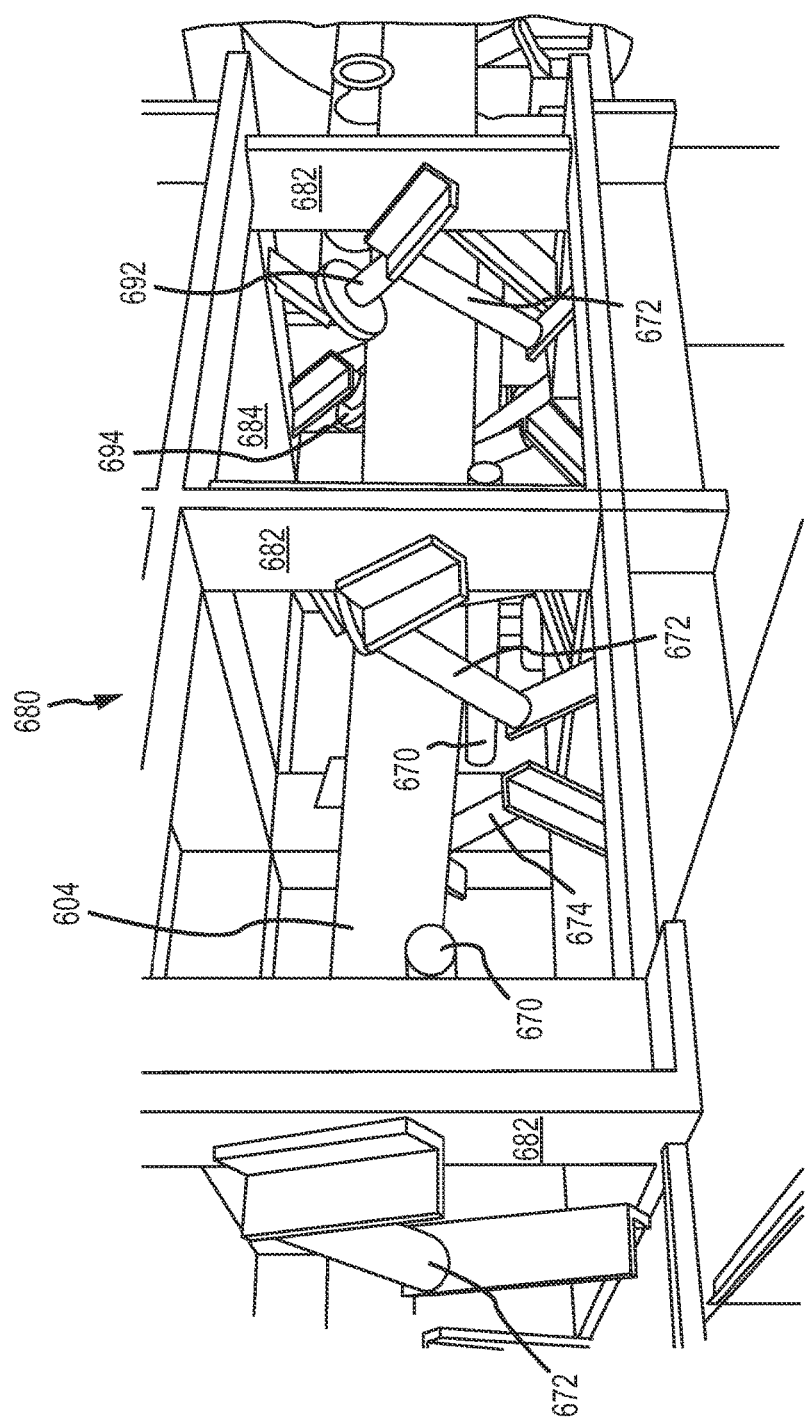
Figure 6E:
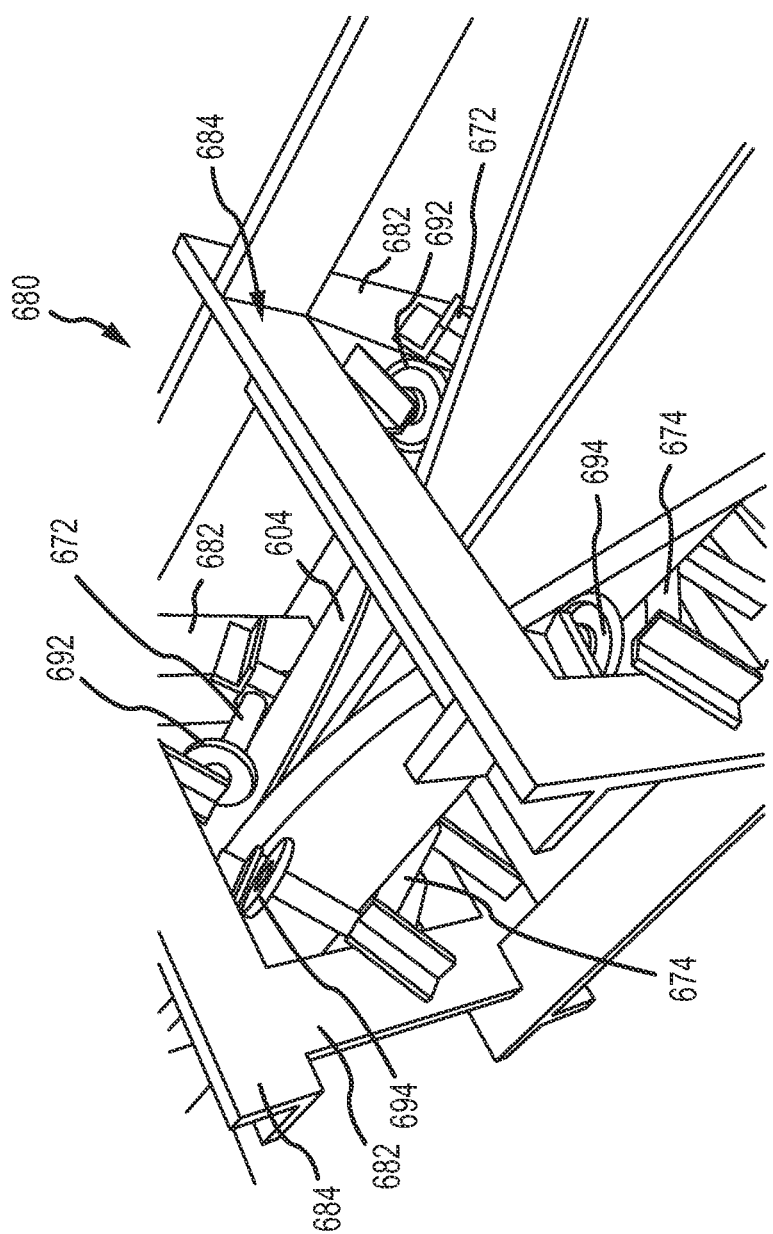

The opening forming roller and wheel structure 680 includes a plurality of vertical and horizontal structural members 682, 684 forming a series of rectangles that surround the belt 604. In other embodiments, the structure members 682, 684 may comprise non-vertical and/or non horizontal structural members (e.g. circular, semi-circular) and may or may not completely surround the belt 604 (e.g., it may be U-shaped or L-shaped). Furthermore, although three rectangles comprised of the vertical and horizontal structural members 682, 684 are shown in FIG. 6C, in other embodiments there may be fewer or more structural members 682, 684 forming fewer or more rectangles.

A plurality of angled support rollers 672, 674 and wheels 692, 694 are supported by the horizontal and vertical structural members 682, 684. There may also be one or more flat (e.g. substantially horizontal) support rollers 670 under the belt 604 that are supported by the horizontal and vertical structural members 682, 684. As shown, the wheels 692, 694 and rollers 682, 684 may be arranged in a series of roller/wheel pairs 672/692 and 674/694 along the first and second sides of the belt 604. Each respective roller/wheel pair 672/692 and 674/694 may be arranged such that a rotational axis of the each respective wheel in a pair is oriented transverse (e.g., substantially orthogonal such as illustrated) to a rotational axis of each respective roller in a roller/wheel pair 672/692, 674/694. In other embodiments, the rollers 672, 674 and wheels 692, 694 need not be arranged in pairs. For example, some or all of the rollers 672, 674 and wheels 692, 694 may instead may be separately supported in an alternating fashion (e.g., a roller, a wheel, a roller, a wheel etc.). Furthermore, although three rollers 672, 674 and three wheels 692, 694 are shown in FIG. 6C on each side of the belt 604, in other embodiments there may be fewer or more than three rollers 672, 674 and wheels 692, 694 on each side of the belt 604. Additionally, in some embodiments wheels 692, 694 may not be needed, in which case, structure 680 may include only the angled rollers 672, 674 and possibly also one or more flat support rollers 670.

The rollers 672, 674 and wheels 692, 694 contact respective first and second sides of the belt 604 with the wheels 692, 694 contacting the belt 604 closer to respective first and second edges of the belt 604 than the rollers 672, 674. Furthermore, some or all of the rollers 672, 674 and the wheels 692, 694 of each roller/wheel pair 672/692 and 674/694 are angled with respect to a horizontal orientation. In this regard, the angle of the rollers 672, 674 may decrease proceeding from the roller/wheel pairs 672/692 and 674/694 furthest from the unloading zone 608 toward the roller/wheel pairs 672/692 and 674/694 closest to the unloading zone 608 while the angle of the wheels 692, 694 may increase proceeding from the roller/wheel pairs 672/692 and 674/694 furthest from the unloading zone 608 toward the roller/wheel pairs 672/692 and 674/694 closest to the unloading zone 608. The decreasing angling of the rollers 672, 674 supports the belt as it transitions from a closed configuration to an open configuration while the increasing angling of the wheels 692, 694 allows edges of the belt 604 to move away from an interlocking position over the central portion of the belt 604 around the haul rope 602 as the belt 604 transitions from the closed configuration to the open configuration. If the structure 680 is being used to close the belt 680 (e.g., when it is proximal to a loading zone or if the direction of the belt 604 needs to be reversed), the increasing angling of the rollers 672, 674 supports the belt as it transitions from an open configuration to a closed configuration while the decreasing angling of the wheels 692, 694 pushes edges of the belt 604 toward and into an interlocking position over the central portion of the belt 604 around the haul rope 602 as the belt 604 transitions from the open configuration to the closed configuration.

While various embodiments of the present invention have been described in detail, further modifications and adaptations of the invention may occur to those skilled in the art. However, it is to be expressly understood that such modifications and adaptations are within the spirit and scope of the present invention.

What is claimed is:
1. A load carrying belt hangable on a haul rope to transport material, said load carrying belt comprising:
a central portion having a profile configured to substantially envelope at least a portion of the haul rope;
a first side portion extending laterally from said central portion, said first side portion being foldable toward said central portion to form a first compartment in which a first quantity of the material is receivable; and
a second side portion extending laterally from said central portion, said second side portion being foldable toward said central portion to form a second compartment in which a second quantity of the material is receivable;
wherein when said first side portion is folded toward said central portion to form said first compartment, a strip of said first side portion proximal to an outside edge of said first side portion overlaps at least a portion of said central portion providing said first compartment with a closed configuration; and
wherein when said second side portion is folded toward said central portion to form said second compartment, a strip of said second side portion proximal to an outside edge of said second side portion overlaps at least a portion of said strip of said first side portion overlapping at least a portion of said central portion providing said second compartment with a closed configuration.

2. The load carrying belt of claim 1 wherein said strip of said first side portion is engageable with said central portion to retain said first side portion in a closed configuration forming said first compartment and disengageable from said central portion to open said first compartment for introduction of the first quantity of material and discharging of the first quantity of the material.

3. The load carrying belt of claim 2 wherein said central portion and said strip of said first side portion include at least one pair of corresponding groove and ridge profiles extending parallel with a lengthwise extent of said central portion and said first side portion configured for insertion of said ridge profile into said groove profile.

4. The load carrying belt of claim 1 wherein said strip of said second side portion is engageable with said strip of said first side portion when said strip of said first side portion overlaps at least a portion of said central portion to retain said second side portion in a closed configuration forming said second compartment and disengageable from said strip of said first side portion to open said second compartment for introduction of the second quantity of material and discharging of the second quantity of the material.

5. The load carrying belt of claim 4 wherein said strip of said first side portion and said strip of said second side portion include at least one pair of corresponding groove and ridge profiles extending parallel with a lengthwise extent of said first side portion and said second side portion configured for insertion of said ridge profile into said groove profile.

6. The load carrying belt of claim 2 wherein said strip of said second side portion is engageable with said strip of said first side portion when said strip of said first side portion overlaps at least a portion of said central portion to retain said second side portion in a closed configuration forming said second compartment and disengageable from said strip of said first side portion to open said second compartment for introduction of the second quantity of material and discharging of the second quantity of the material.

7. The load carrying belt of claim 3 wherein said strip of said second side portion is engageable with said strip of said first side portion when said strip of said first side portion overlaps at least a portion of said central portion to retain said second side portion in a closed configuration forming said second compartment and disengageable from said strip of said first side portion to open said second compartment for introduction of the second quantity of material and discharging of the second quantity of the material.

8. The load carrying belt of claim 6 wherein said strip of said first side portion and said strip of said second side portion include at least one pair of corresponding groove and ridge profiles extending parallel with a lengthwise extent of said first side portion and said second side portion configured for insertion of said ridge profile into said groove profile.

9. The load carrying belt of claim 7 wherein said strip of said first side portion and said strip of said second side portion include at least one pair of corresponding groove and ridge profiles extending parallel with a lengthwise extent of said first side portion and said second side portion configured for insertion of said ridge profile into said groove profile.

\* \* \* \* \*